United States Patent [19]
Chakrabarti et al.

[11] Patent Number: 6,163,692
[45] Date of Patent: Dec. 19, 2000

[54] TELECOMMUNICATION NETWORK WITH MOBILE VOICE CONFERENCING SYSTEM AND METHOD

[75] Inventors: Satyabrata Chakrabarti, Aurora; Amitabh Mishra, Oak Brook, both of Ill.

[73] Assignee: Lucent Technologies, Inc., Murray Hill, N.J.

[21] Appl. No.: 09/086,400

[22] Filed: May 28, 1998

[51] Int. Cl.[7] .................................................. H04M 3/42
[52] U.S. Cl. ...................... 455/416; 455/519; 379/205; 379/209; 370/261
[58] Field of Search ..................................... 455/416, 414, 455/417, 519, 445, 422, 433, 560, 464, 439; 379/112, 203, 204, 207, 242, 230, 93.14; 370/264, 524, 261

[56] References Cited

U.S. PATENT DOCUMENTS

| | | | |
|---|---|---|---|
| 4,481,383 | 11/1984 | Madon | 379/112 |
| 4,540,850 | 9/1985 | Herr et al. | 379/88.19 |
| 4,691,347 | 9/1987 | Stanley et al. | 379/203 |
| 4,829,554 | 5/1989 | Barnes et al. | 455/432 |
| 4,998,243 | 3/1991 | Kao | 370/264 |
| 5,566,236 | 10/1996 | MeLampy et al. | 379/201 |
| 5,765,108 | 6/1998 | Martin et al. | 455/422 |
| 5,963,864 | 10/1999 | O'Neil | 455/445 |
| 5,991,389 | 11/1999 | Ram et al. | 379/230 |

*Primary Examiner*—William G. Trost
*Assistant Examiner*—Charles Craver

[57] ABSTRACT

A telecommunication network including one or more personal communication networks with a conference bridge for making voice conference connections between some of a plurality of mobile telephones associated with a personal communication network having a plurality of mobile sub-networks respectively for providing mobile telephone service to the plurality of mobile telephones as well as with fixed-location or non-mobile telephones associated with a Public Switched Telephone Network switching center provided with a disconnection voice conferencing system that detects disconnection of a communication link between any one of the mobile telephones and the communications bridge, distinguishes between an intentional disconnection and accidental disconnection of the one mobile telephone, and if the disconnection is determined to have been unintentional, automatically establishes reconnection of the communication link.

41 Claims, 22 Drawing Sheets

FIG. 1
PRIOR ART SYMBOLS FOR LOGIC FLOW DIAGRAMS
STATE
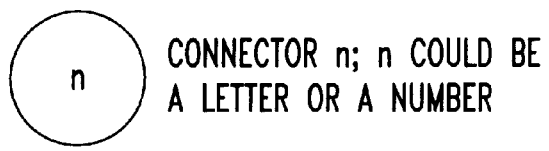
CONNECTOR n; n COULD BE A LETTER OR A NUMBER
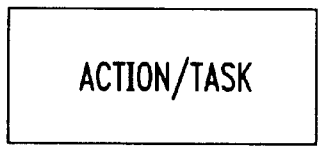
ACTION/TASK
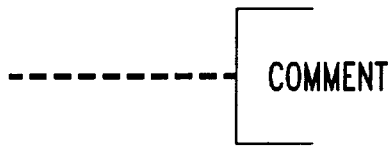
COMMENT
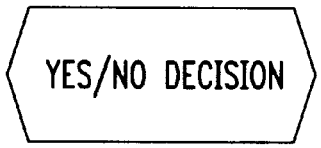
YES/NO DECISION

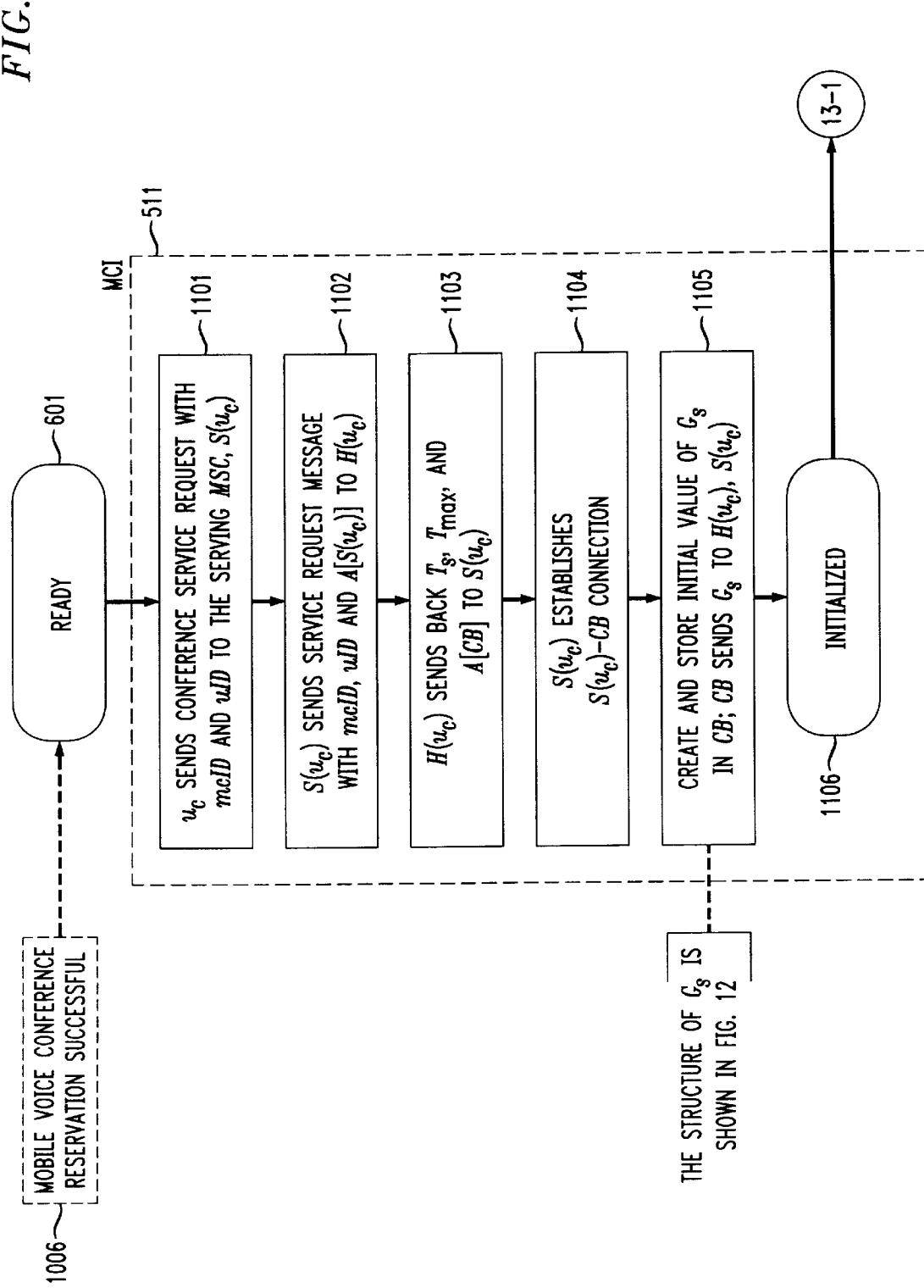

FIG. 12

GLOBAL STATE INFORMATION, $G_s$ — 1201

| mcID |
| TIMESTAMP, $T_c$ |
| $k$ = NUMBER OF CURRENT PARTICIPANTS |
| $uID(u_1)$ |
| ⋮ |
| $uID(u_c)$ |
| ⋮ |
| $uID(u_k)$ |
| TYPE OF $u_i$ FOR ALL $i$ |
| $A[H(u_1)],\ldots,A[H(u_k)]$, FOR EACH $u_i$, ABOVE |
| $A[S(u_1)],\ldots,A[S(u_k)]$, FOR EACH $u_i$, ABOVE |
| STATUS OF EACH DISTINCT CONNECTION SEGMENT $S(u_i)$-CB |
| STATUS OF EACH DISTINCT CONNECTION SEGMENT $S(u_i)$-$u_v$, AS ABOVE |
| $T_{dur}(u_1),\ldots,T_{dur}(u_k)$ FOR ALL $u_i$, ABOVE; $T_{dur} =_{df} T_{dur}(u_c)$. |

ADMISSIBLE STATUS VALUES — 1202

- ACTIVE
- INACTIVE
- DISMANTLED

TELECOMMUNICATION NETWORK WITH MOBILE VOICE CONFERENCING SYSTEM AND METHOD

BACKGROUND OF THE INVENTION

This invention generally relates to a telecommunication network and, more particularly, to such a network with a mobile voice conferencing system and method.

Voice conferencing is a major revenue-generating category of services in the Public Switched Telephone Networks (PSTN). With rapid growth of digital wireless access, an era of Personal Communication Networks (PCN) is emerging in which the mobility of both terminals and users is the defining attribute. Currently, in known PSTN systems a wireless subscriber to a PCN can transparently access the conventional PSTN voice conferencing service. However, in the PSTN service, in the event of a connection loss to a conference participant, the burden of rejoining the conference is placed on the conference participant with the lost connection. In order for the participant to rejoin the conference after a lost connection due to any reason, the participant must redial a special voice conference number.

Because of the nature of the air-wave transmission, there is a higher likelihood of connection loss in the wireless cellular radio environment of a PCN than in a land based PSTN during a voice conference. Consequently, there is a greater chance that a PCN participant in a PSTN conference will be forced to redial the special voice conference number much more frequently to rejoin the conference than will a land based PSTN user of the same voice conference.

While more versatile multimedia conferencing services are emerging with the promise of superior scaleability and dynamic participation management (for example, Van Jacobson, "Multimedia Conferencing on the Internet," SIGCOMM 94 Conference Tutorial Notes, London, U.K., August 1994, Ref. 14 below), they can be accessed only with specialized terminals, often a specially adapted personal computer (PC) or a workstation, that are beyond the reach of most users worldwide. None yet accommodate the special attributes of mobility. The concept of a Personal Communication Network is an evolutionary step that is emerging from widely deployed Public Land Mobile Networks (PLMN) as illustrated in "Public Land Mobile Networks: ITU-T Recommendations Q.1000–Q.1063," and Recommendations cited therein, Geneva, Switzerland: International Telecommunications Union (ITU), Ref. 5 below, and in "Public Land Mobile Network: Mobile Application Part and Interfaces," CCITT Recommendations Q.1051–Q.1063, Blue Book, Vol. VI, Fascicle VI.13, Geneva, Switzerland: ITU, 1988, Ref. 6 below, which are hereby incorporated by reference.

SUMMARY OF THE INVENTION

In accordance with the present invention the problems with the known voice conferencing systems of known PSTN with respect to use by PCN mobile telephone subscribers is overcome by provision of apparatus and methods which function automatically to rejoin a mobile telephone participant of a PCN to a voice conference of a voice conferencing system of a PCN in the event of connection loss with the mobile telephone.

In accordance with the invention, the mobile telephone is provided with means for automatically establishing reconnection of the communication link of the mobile telephone with the ensuing voice conference upon detection that there has been a connection loss with the mobile telephone during the course of a voice conference. This is advantageously achieved without any significant alteration to the existing hardware, firmware or operating software of the PSTN voice conferencing system, and of the PCNs for which the mobile voice conference service of this invention is deployed.

In the preferred embodiment of the invention, the mobile voice conference service network works within and generally in accordance with the topologies and signaling protocols defined in various standards including those described and shown in one or more of the following references, the disclosures of which are hereby incorporated by reference and should be referred to for further details as desired. These references, which are incorporated by reference, are:

[1] "Specifications of Signaling System No. 7: Recommendations Q.700–Q.709" [Introduction and Message Transfer Part (MTP)], Geneva, Switzerland: International Telecommunications Union (ITU-T).

[2] "Specifications of Signaling System No. 7: ITU-T Recommendations Q.711–Q.716" [Signaling Connection Control Part (SCCP)], Geneva, Switzerland: International Telecommunications Union (ITU).

[3] "Specifications of Signaling System No. 7: ITU-T Recommendations Q.761–Q.766" [Integrated Services digital network User Part (ISUP)], Geneva, Switzerland: International Telecommunications Union (ITU).

[4] "Specifications of Signaling System No. 7: ITU-T Recommendations Q.771–Q.775" [Transaction Capabilities Application Part (TCAP)], Geneva, Switzerland: International Telecommunications Union (ITU).

[5] "Public Land Mobile Networks: ITU-T Recommendations Q.1000–Q.1063" (and Recommendations cited therein)], Geneva, Switzerland: International Telecommunications Union (ITU).

[6] "Public Land Mobile Network: Mobile Application Part and Interfaces," CCITT Recommendations Q.1051–Q.1063, Blue Book, Vol. VI, Fascicle VI.13, Geneva, Switzerland: ITU, 1988.

[7] "General Recommendations on Telephone Switching and Signaling-Intelligent Network: ITU-T Recommendations Q.1200–Q.1290," Geneva, Switzerland: International Telecommunications Union (ITU).

[8] "Data Networks and Open Systems Communications-Open Systems Interconnection: ITU-T Recommendations X.200," Geneva, Switzerland: International Telecommunications Union (ITU), and all other CCITT and ITU-T Recommendations cited therein.

[9] "Programming Languages: CCITT Specification and Description Language (SDL), ITU-T Recommendations Z.100" and "Programming Languages SDL Methodology Guidelines and SDL Bibliography: Appendices I and II," ITU-T Recommendations Z.100, International Telecommunications Union (ITU).

[10] A. Modaressi and R. Skoog, "Signaling System No. 7: A Tutorial," IEEE Communications Magazine, Vol. 28, No. 7., June 1990, pp. 44–56.

[11] M. Mouly and M.-B. Pautet, "The GSM System for Mobile Communications," Palaiseau, France: Private publication by the Authors, 1992.

[12] "EIA/TIA IS-41 (Revision C): Cellular Radio-Telecommunications Intersystem Operations," Washington, D.C.: Telecommunications Industry Association, 1995.

[13] V. 0. K. Li and X. Qiu, "Personal Communications Systems (PCS)," Proc. IEEE, Vol. 83, No. 9, Sept. 1995, pp. 1210–1243.

[14] Van Jacobson, "Multimedia Conferencing on the Internet," SIGCOMM 94 Conference Tutorial Notes, London, U.K., August 1994.

In the preferred embodiment, a telecommunication network having a plurality of mobile telephones and a conference bridge for establishing voice conference connections between a plural number of the plurality of mobile telephones when communication linked with the conference bridge, is provided with an automatic connection recovery mobile, telephonic, voice conferencing system and methods for detection of disconnection of a conference communication link between any one mobile telephone of the plural number mobile telephones and the conference bridge and automatic establishment of reconnection of the conference communication link between the one mobile telephone and the conference bridge in response to the detection. Preferably the detection is performed by a detector, implemented as software, with means for distinguishing between an intentional disconnection initiated by action taken at the one mobile telephone and unintentional disconnection resulting from other causes, and an indication of disconnection to cause automatic establishment of reconnection is provided only in response to detection of an unintentional disconnection.

In the preferred embodiment, the detecting means includes means for monitoring the connection status of the communication link of the one mobile telephone with a communication port of the conference bridge, and means responsive to the monitoring means detecting disconnection of the communication link for distinguishing between an intentional disconnection and an unintentional disconnection.

Preferably, the detecting means includes means for sensing disconnections at different segments of the communication link including means for sensing disconnection of the communication link caused by interruption in a land line section of the link between a mobile switching center serving the mobile participant and a mobile switching center of the PCN with which the conference bridge is associated, means for sensing disconnection of the communication link causes by interruption in a land line section of the link between a base station associated with both the one subscriber and the mobile switching center, and means for sensing disconnection of the communication link caused by a interruption in an air wave section of the link between the one mobile participant and the mobile switching center serving the mobile participant during the course of the voice conference.

Also, in the preferred embodiment of the telecommunication network in which the invention is advantageously employed includes a mobile switching center interconnected between a public switched telephone network and having a plurality of PCN subnetworks with at least one of the subnetworks associated with the one mobile telephone to provide mobile air wave communication service to the one mobile telephone. The one mobile telephone includes the means for transmitting a signal to the associated subnetwork, and the associated subnetwork includes means for sending a conference request message to the mobile switching center in response to the signal from the one mobile telephone, and the mobile switching center includes means responsive to the conference request message to cause connection of the one mobile telephone to the conference bridge. The reconnection establishing means includes means at the associated subnetwork for actuating the conference request message sending means to send a conference request message to the mobile switching center to establish reconnection of the communication link with the one mobile telephone automatically in response to the detecting means detecting disconnection of the communication link with the one mobile telephone.

Preferably, an initiator mobile telephone from which the conference is initiated is included in the plural number of mobile telephones. The initiator mobile telephone at any given time is located within the service area of an initiator current service subnetwork of the plurality of mobile PCNs that are part of the mobile voice conference service network. The mobile voice conference service network includes means for storing global state information about the voice conference that enables automatic reconnection regardless of the movement of the mobile telephones between subnetworks during the course of the voice conference.

The initiator mobile telephone has one relatively permanently associated initiator home subnetwork of the plurality of PCNs in the mobile voice conference service network, and the global state information storing means includes means at the initiator home subnetwork for storing the global state information. The initiator mobile telephone at any given time is in a service area of, and currently receives mobile telephone service from, an initiator current service subnetwork. The global state information storing means preferably includes means at the initiator current service subnetwork for separately storing the global state information when the initiator mobile telephone is in a service area other than a service area of the relatively permanently associated initiator home subnetwork.

In the preferred embodiment, the initiator current service subnetwork includes means for acquiring the global state information about the voice conference, means for ascertaining whether the initiator current service subnetwork is different from the initiator home subnetwork, and means responsive to the ascertaining means for transmitting the global state information from the initiator current service subnetwork to the initiator home subnetwork for duplicate storage of the global information at the initiator home subnetwork when the initiator current service subnetwork is different from the initiator home subnetwork.

BRIEF DESCRIPTION OF THE DRAWINGS

The foregoing advantageous features will be described and additional advantageous features will be made apparent from the following description of the preferred embodiment of the invention that is given with reference to the several figures of the drawings, in which:

FIG. 1 is an illustration of the types of symbols used in the logic flow diagrams used in the following drawing figures;

FIG. 11 is a logic flow chart of the preferred method of initializing a mobile voice conference of this invention;

FIG. 12 illustrates the informational elements comprising the general global state information, $G_s$;

DETAILED DESCRIPTION

FIG. 1 is an illustration of symbols selected from "Programming Languages: CCITT Specification and Description Language (SDL), ITU-T Recommendations Z.100" and "Programming Languages SDL Methodology Guidelines and SDL Bibliography: Appendices I and II," ITU-T Recommendations Z.100, http://www.itu.ch/itudoc/itu-t/rec/z100.htm, Geneva, Switzerland: International Telecommunications Union (ITU), hereby incorporated by reference, that are used to represent the logical flow diagrams for the mobile voice conference service of this invention.

Figure 2:
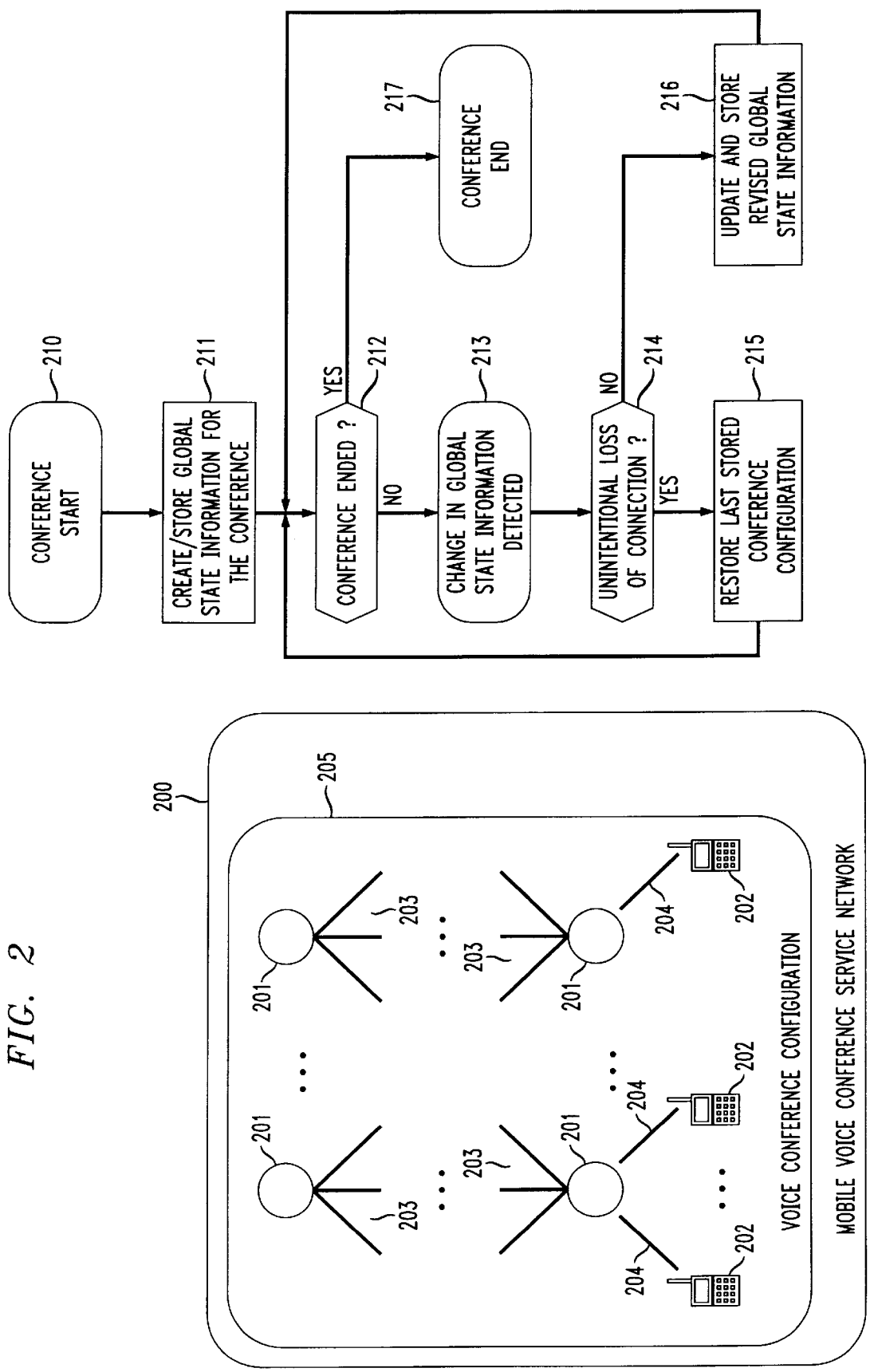
FIG. 2 is a high-level functional representation and associated logic flow diagram for the mobile voice conference service of this invention within a telecommunication network, hereinafter called the mobile voice conference service network (MCSN), in which the present invention is advantageously employed.

Referring to FIG. 2, a high level representation of the novel ideas of the invention described here includes the notion of a mobile voice conference service network 200 that provides the mobile voice conference service of this invention to appropriate mobile telephones 202. The various network elements 201 other than the mobile telephones 202 used by the subscribers, e.g., a switch or a database, are connected by appropriate land-line facilities 203. The mobile telephones 202 are connected to the appropriate network elements 201 solely over a cellular radio access facility 204. The uniquely distinguishing feature of the mobile voice conference service network 200 is its ability to store, track, and update the relevant information for every connection segment associated with a particular mobile voice conference of this invention throughout the duration of the conference. The information for each connection segment includes the specific network addresses for its end-points, e.g., the address of a mobile telephone, or that of a mobile switching center, or a PSTN switching center, etc. Collectively, such information is called herein the global state of the conference, which may change substantially with time during the conference, for example, to accommodate the addition of new participant to the conference, departure of an existing participant from the conference, and notably the distinguishing novelty of the invention reported here, the automatic recovery of the conference connection when an existing participant is unintentionally disconnected from the mobile voice conference.

The global state information for a mobile voice conference necessarily includes the conference configuration 205, described as the totality of all the connection segments and their respective endpoints with uniquely identifiable network addresses. Still referring to FIG. 2, a high-level logic flow chart for the mobile voice conference service with the ability to recover automatically from disconnections of a certain type needs to include a mechanism for creating and storing the global state information at the beginning of the conference 211, detect changes in the global state information for the conference 213, and appropriately updating and storing the global state information 215 216 whenever there is a change in the global state information. If a mobile voice conference service subscriber 202 is unintentionally disconnected from the mobile voice conference service network 200, the network 200 detects that such a disconnection has occurred and that the disconnection has been unintentional 214. The resulting conference configuration, as a temporary information assembly, is compared against the last stored conference configuration to identify the missing connection segments and their end-points so that the network can restore the missing connection as determined by the global state information 215. The creation of the global state information 211 is done as soon as the conference starts 210, and its final contents are stored by the service provider, if desired, even after the conference ends 217.

Preferably, all information exchange for a mobile voice conference service within a mobile voice conference service network is done using packet-mode message-oriented signaling, as shown and described in M. Mouly and M.-B. Pautet, "The GSM System for Mobile Communications," Palaiseau, France: Private publication by the Authors, 1992, Ref. 11, noted above, in and V. O. K. Li and X. Qiu, "Personal Communication Systems (PCS)", Proc. IEEE, Vol.83, Sept. 1995, pp.1210–1243, Ref. 13, noted above, and in "General Recommendations on Telephone Switching and Signaling-Intelligent Network: ITU-T Recommendations Q.1200–Q.1290," http://www.itu.ch/itudoc/itu-t/rec/q1200.htm-q1290.htm, Geneva, Switzerland: International Telecommunications Union (ITU), Ref. 7, noted above. The transport services for such message-oriented signaling is provided by the common channel signaling network (CCSN), as shown and described in A. Modaressi and R. Skoog, "Signaling System No. 7: A Tutorial," IEEE Communications Magazine, Vol. 28, No. 7., June 1990, pp. 44–56, Ref. 10, noted above, in "Specifications of Signaling System No. 7: Recommendations Q.700–Q.709" [Introduction and Message Transfer Part (MTP)], http://www.itu.ch/itudoc/itu-t/rec/q700.htm-q709.htm, Geneva, Switzerland: International Telecommunications Union (ITU-T), Ref. 1, noted above, and in "Specifications of Signaling System No. 7: ITU-T Recommendations Q.711–Q.716" [Signaling Connection Control Part (SCCP)], http://www.itu.ch/itudoc/itu-t/rec/q711.htm-q716.htm, Geneva, Switzerland: International Telecommunications Union (ITU), Ref. 2, noted above, and in "Specifications of Signaling System No. 7: Q.771–Q.775" [Transaction Capabilities Application Part (TCAP)], http://www.itu.ch/itudoc/itu-t/rec/q771.htm-q775.htm, Geneva, Switzerland: International Telecommunications Union (ITU), Ref. 4, which are hereby incorporated by reference.

Figure 3:
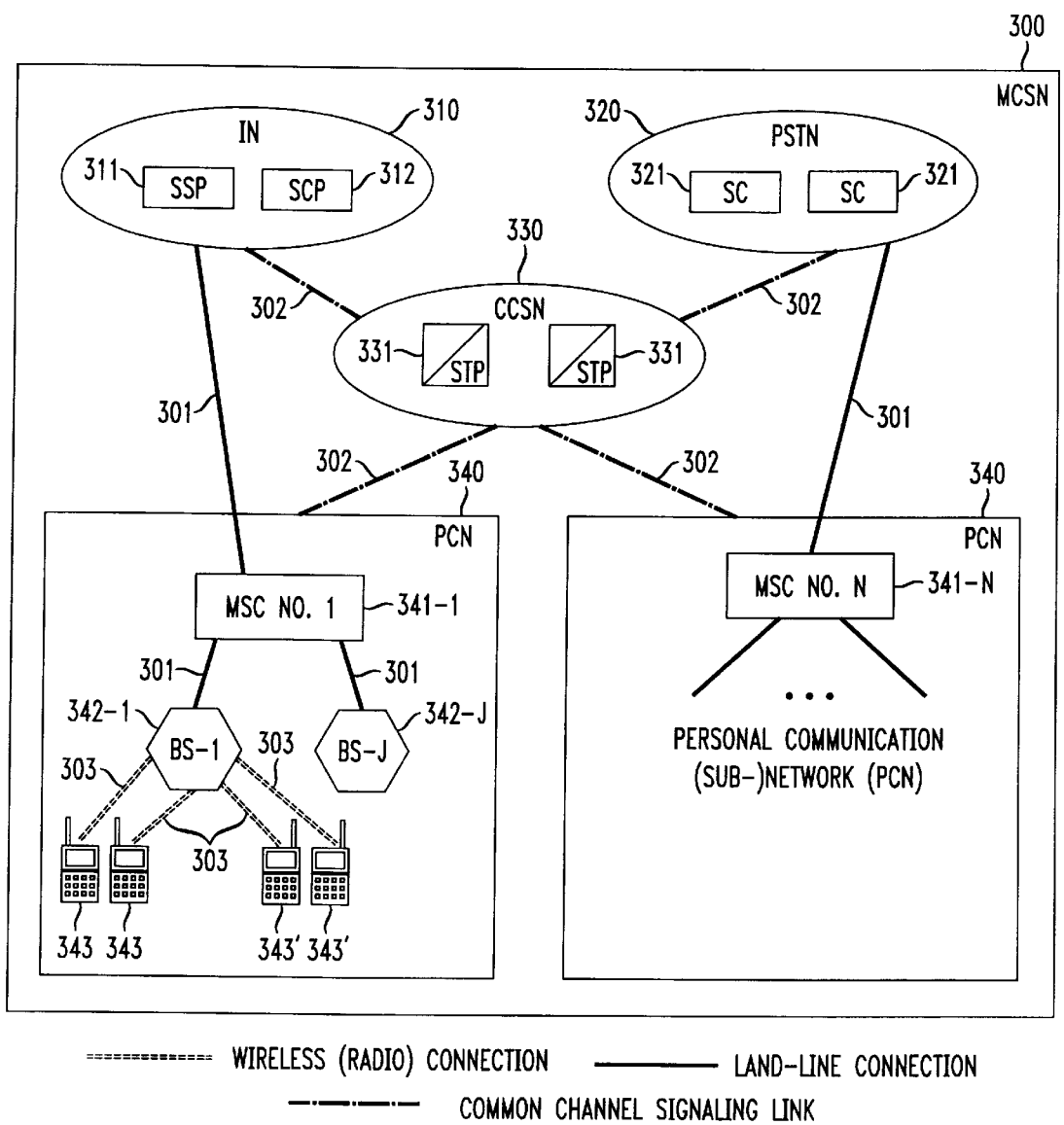
FIG. 3 is a simplified block diagram of the mobile voice conference service network, a telecommunication network in which the preferred embodiment of the present invention is advantageously employed.

FIG. 3 shows a more detailed functional representation 300 of the mobile voice conference service network 200 of FIG. 2 in which the present invention is advantageously employed. The mobile voice conference service network 300 incorporates the basic functions of the PCN 340, including those of mobility based on the systems elaborated in Ref. 11, noted above and in EIA/TIA IS-41 (Revision C), "Cellular Radio-Telecommunications Intersystem Operation", Washington, D.C., Telecommunications Industry Association, 1995, Ref. 12, noted above, which are hereby incorporated by reference. Substantially the same notation and terminology used in these references are used here where appropriate. In addition, the mobile voice conference service network 300 in which the invention is advantageously employed also incorporates and the appropriate functions and equipment of the Intelligent Network 310, Ref. 7, noted above, which in turn, incorporates the appropriate functions and equipment of a public switched telephone network, or PSTN 320, and of a common channel signaling network (CCSN) 330, Ref. 10, noted above. In other words, the nodes (network elements) of the mobile voice conference service network contain a composite of appropriate PCN 340, Ref. 11, noted above, Intelligent Network 310, Ref. 7 and Ref. 9, noted above, and PSTN functions. The network elements belonging to the PSTN 320 and CCSN 330 are generally interconnected via land lines 301 302. These are also connected via land lines with a plurality of mobile switching centers, or MSCs, 341 individually numbered from 1 to N, where N is a natural number. Each of the MSCs 341, in turn, is connected via land lines to a plurality of base stations, or BSs, 342, individually numbered from 1 to J, where J is a natural number, as shown only with respect to the MSC 341 individually numbered one for the sake of simplicity. Each of these base stations or 342, in turn, provides two-way, full duplex telephonic radio communication linkage to the PSTN 320 via its associated MSC 341 with a plurality of mobile telephones 343 343' relatively permanently associated with, and located within, the geographical limits of its associated cells Ref. 11, noted above. Depending upon the movement of the mobile telephones 343 343', each base station 342 also establishes a radio link 303 with the mobile telephone.

A mobile subscriber, when using a particular mobile telephone 343, has a unique subscription relationship with a single PCN 340, called the home PCN of the mobile telephone (in association with the specific subscriber) which consists of mutually non-overlapping MSC areas, as shown and described in Ref. 11, noted above. Each MSC area is defined as the largest collection of radio cells that are managed by a single MSC 341 Ref. 11, noted above. For any PCN 340, there are multiple mobile telephones 343–343' requesting or receiving service at any given time, some of which 343 have the home subscription relationship with the particular PCN and the rest do not 343'. The mobile telephones of the latter kind are variously called a visiting subscriber, a roaming subscriber, or a roving subscriber 343'.

A PCN, in general, consists of multiple MSC areas, Ref. 11, noted above. However, the presentation of the invention becomes simpler by allowing each PCN to contain only a single MSC area with its own unique MSC 341. Equivalently each MSC 341 in combination with its associated base stations 342 and the mobile telephones 343 describe a personal communication network, or PCN, 340-1 through 340-N connected to the PSTN 12 over land lines, hereinafter referred to generally as PCN 340. A plurality of other land based, PSTN switching centers, or SCs, 321 are also connected with the MSCs 340 for connection with land based, fixed location, or non-mobile, telephones and other telephonic equipment. In accordance with the invention, the subscribers to the PSTN are enabled to participate in the mobile voice conference but is not enabled to initiate the conference or obtain automatic reconnection service from the personal communication networks 340.

Referring to FIG. 3, it is important to observe that in practice, more than one functional blocks shown as belonging to the PCN 340, Ref. 11, noted above, Intelligent Network 310, Ref. 7, noted above, Common Channel Signaling network 330, Ref. 10, noted above, and PSTN 320 are implemented in a single physical node of the mobile voice conference service network 300 all of which are hereby incorporated by reference. For example, a 5ESS® switch from Lucent Technologies preferably simultaneously includes the functions of the MSC 341 of a PCN 340, the Service Switching Point (SSP) 311 functions of an Intelligent Network 310, the Signal Transfer Point (STP) 321 functions of a common channel signaling network, and the usual call processing and switching functions of a PSTN 320 switching center, SC 321, providing the usual "Plain Old Telephone Service" (POTS).

In the preferred embodiment of this invention, all the nodes of mobile voice conference service network are equipped with the necessary common channel signaling functions as a prerequisite to providing the mobile voice conference service of this invention. All signaling between MSC 341, between an MSC and its associated base stations 342, between an MSC 341 and a node of the Intelligent Network 310 and PSTN 320, and within the Intelligent Network 310 and PSTN 320, is done using various functions of the Common Channel Signaling System No. 7, or SS7, noted above in Ref. 10, and as also shown and described in the ITU-T "Specifications of Signaling System No. 7: Recommendations Q.700–Q.709" [Introduction and Message Transfer Part (MTP)], http://www.itu.ch/itudoc/itu-t/rec/q700.htm-q709.htm, Geneva, Switzerland: International Telecommunications Union (ITU), Ref. 1, noted above, in "Specifications of Signaling System No. 7: ITU-T Recommendations Q.711–Q.716" [Signaling Connection Control Part (SCCP)], http://www.itu.ch/itudoc/itu-t/rec/q711.htm-q716.htm, Geneva, Switzerland: International Telecommunications Union (ITU), Ref. 2 noted above, in ITU-T "Specifications of Signaling System No. 7: ITU-T Recommendations Q.761–Q.766" [Integrated Services digital network User Part (ISUP)], http://www.itu.ch/itudoc/itu-t/rec/q761.htm-q766.htm, Geneva, Switzerland: International Telecommunications Union (ITU), Ref. 3, noted above, in "Specifications of Signaling System No. 7: ITU-T Recommendations Q.771–Q.775" [Transaction Capabilities Application Part (TCAP)], http://www.itu.ch/itudoc/itu-t/rec/q771.htm-q775.htm, Geneva, Switzerland: International Telecommunications Union (ITU), Ref. 4, noted above, in Ref. 5, noted above, and in "Public Land Mobile Network: Mobile Application Part and Interfaces," CCITT Recommendations Q.1051–Q.1063, Blue Book, Vol. VI, Fascicle VI. 13, Geneva, Switzerland: ITU, 1988, Ref. 6, noted above, which are hereby incorporated by reference.

Figure 4:
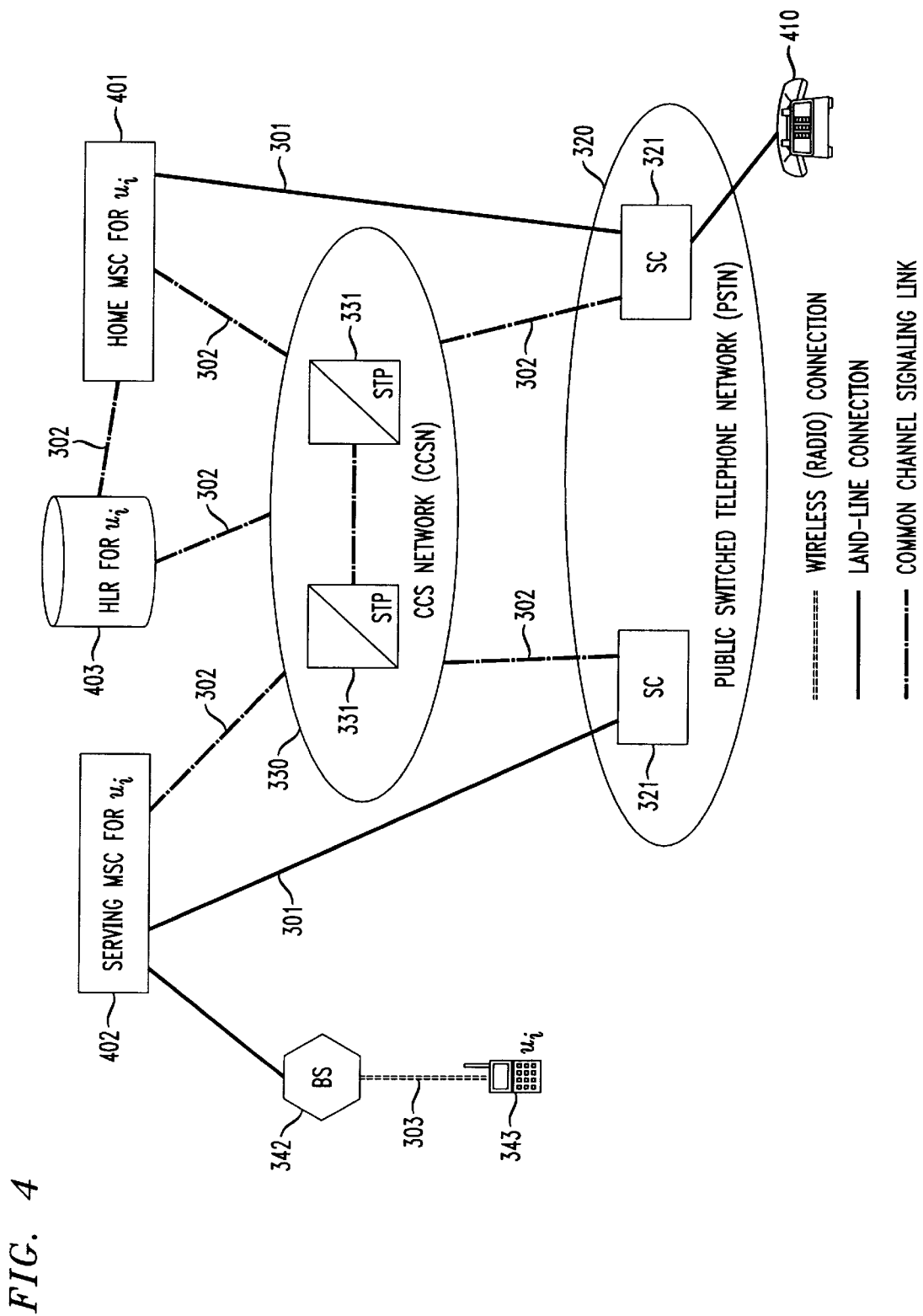
FIG. 4 is a high-level functional diagram of the cellular mobile personal communication network with CCSN and PSTN serving as the essential infrastructure.

FIG. 4 illustrates a high-level block diagram of a generic cellular mobile personal communication network 340 with the common channel signaling network 330 and PSTN 320 serving as the essential infrastructure, Ref. 11, noted above. The MSC 401 provide for the necessary switching, routing, addressing, and signaling functions for wireless cellular mobile services to the subscribers of such services. The Home Location Register (HLR) 403 is a specialized database which is used to store the profiles of the subscribers of the cellular mobile services. An HLR 403 is physically implemented in one of several places in the cellular mobile network—it may coexist with other software in a MSC 401, or alternatively is implemented on its own dedicated platform, or coexist with an existing Intelligent Network element, such as the SCP (Service Control Point) of an Intelligent Network, Ref. 7 and Ref. 11, noted above. In the preferred embodiment of this invention, the preferred physical locations for the HLR 403 functions is a SCP of Intelligent Network, Ref. 7, as noted above.

Still referring to FIG. 4, when a mobile telephone (i.e., the equipment used by the subscriber to receive mobile services) is first activated (powered-on), it immediately registers with the "Local MSC," which after appropriate authentication, etc., becomes the so-called "serving MSC" 402 for that particular mobile telephone 343. The "serving MSC" 402 then queries the HLR database 403 associated with the subscriber's "home MSC" 401 to determine the which service features the specified subscriber is authorized to receive. Each MSC 401 402 in the network is required to maintain the information relating to the network identity of each individual mobile telephones and the network addresses (PSTN now, data networking addresses, in the future) for its respective "home MSC" 401 and HLR 403. If the HLR 403 is not on the same shared platform as the "home MSC," 401 the query occurs via the common channel signaling network 330 using the procedures specified in Ref. 11, noted above and Ref. 11, respectively for GSM or IS-41. Essential for the operation of any cellular mobile network is the fact that HLR 403 tracks, stores, updates and retrieves on demand the necessary information about the "location" of the mobile subscriber station set as determined by the "address" of the "serving MSC" 401. After receiving the service authorization from the HLR 403, the "serving MSC" 402 completes the connection between the requesting subscriber and the desired destination using the facilities and services provided by the PSTN 320 and common channel signaling network 330.

Figure 5:
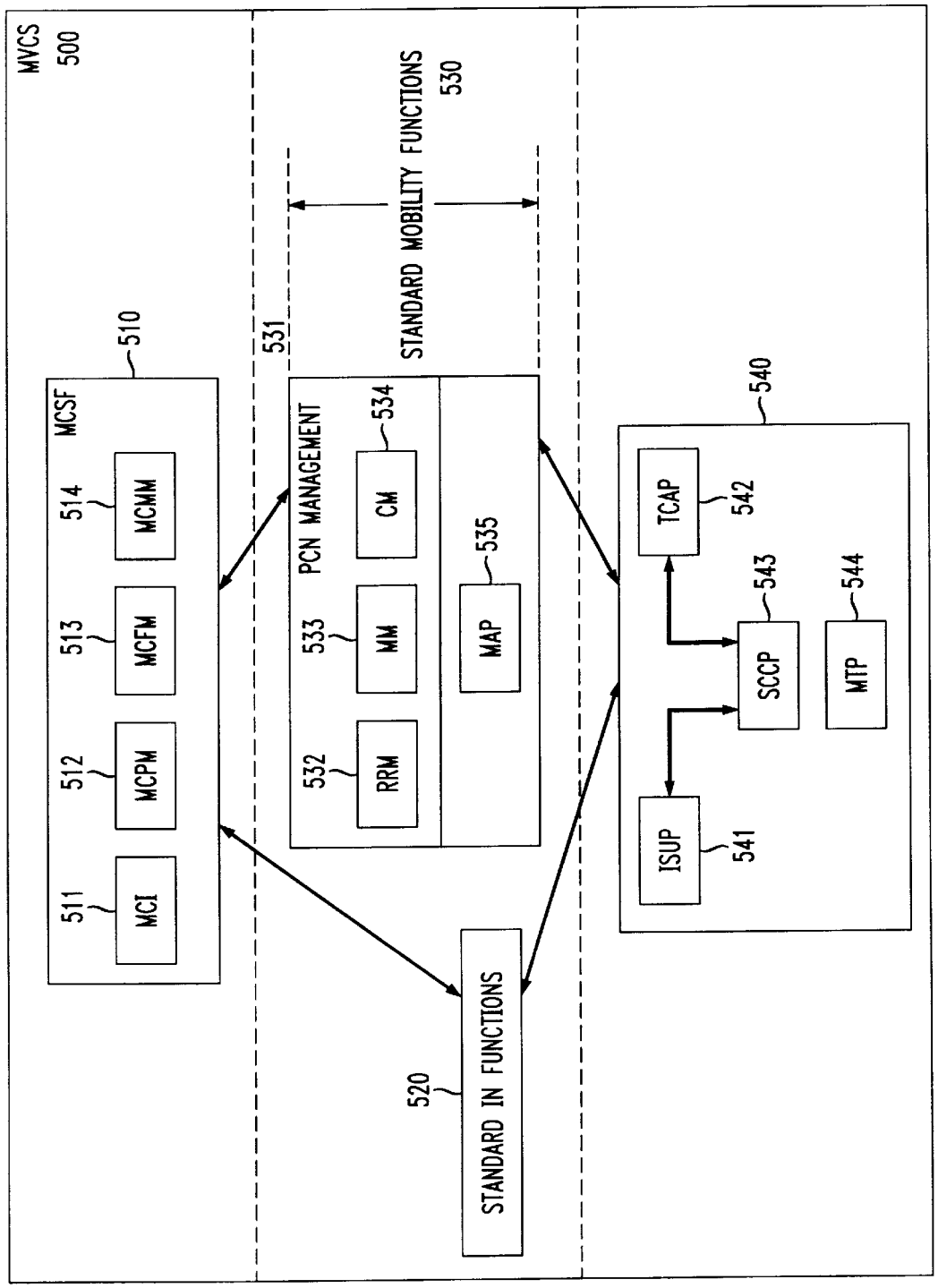
FIG. 5 is a functional decomposition of the mobile voice conferencing service of this invention at each node of the mobile voice conference service network using PCN, IN and CCS networks.

FIG. 5 shows a general functional decomposition of the signaling and call processing functions in each mobile voice conference service network node 500 for the mobile voice conference service of this invention. The overall functionality 500 is partitioned in multiple layers. The top layer of FIG. 5, MCSF (the mobile conference service functions) 510, consists of those additional call control and signaling functions that are specific to the mobile voice conference service of this invention. In FIG. 5, these are represented as four essential functional groupings performed by the PCN 340 in order for it to achieve conferencing in accordance with the preferred method of the invention. A mobile conference initialization (MCI) function 511 includes steps necessary to begin the conference by exchanging signaling messages between the conference initiator and the mobile voice conference service network 340 via an appropriate base station 342. A mobile conference participation management (MCPM) function 512 includes performance of steps necessary to keep track of all the participants at any given time and the total duration of their individual participation. Each mobile participant has the options to join the conference, to drop out of the conference and to rejoin the conference. In accordance with the present invention, the functional grouping, mobile conference failure management (MCFM) 514, provides the necessary detection and restoration functions for maintaining the integrity of the conference by providing to the mobile voice conference service network the ability of automatic recovery of conference connection to mobile telephone subscribers that are unintentionally lost due to radio signal interference and other exception conditions in the PCN rather than due to intentional termination by a mobile telephone subscriber described above for this invention. Finally, a mobile conference mobility management function (MCMM) 513 function includes performance of all mobility management functions of registration, deregistration, locating and tracking mobile terminals 343, and hand-over within the context of a conference. These conference mobility management functions accommodate the movement of the mobile telephones 343 moving in and out of cells, or various location or MSC areas, or PCNs, Ref. 11, noted above.

Still referring to FIG. 5, immediately underneath the mobile conference service function (MCSF) sub-layer 510 is the standard mobility functions 530 as described in Ref 11, noted above. The standard mobility functions 530, are further split into two sub-layers, the PCN Management sub-layer 531, and the Mobile Application Part sub-layer 535. The mobile voice conference service receives the necessary functional services from the PCN management sub-layer 531, Section 2.2 of Ref. 11; noted above and from the standard Intelligent Network functions 520, Ref. 7, noted above. The Intelligent Network functions 520 use the standard common channel signaling functions 540 as described in Ref. 1, noted above, Ref. 2, noted above, Ref. 3, noted above, Ref. 4, noted above, and Ref. 7, noted above. Likewise, the PCN management sub-layers uses services of the standard common channel signaling functions as described in Ref. 1, noted above, Ref. 2, noted above, Ref. 3, noted above, Ref. 4, noted above, Ref. 5, noted above, Ref. 6, noted above, and Ref. 9, noted above, using the Mobile Application Part (MAP), as described in as described in Ref. 6, noted above, and in Ref. 8, noted above.

Still referring to FIG. 5, the four essential functional components of mobile conference service functions are viewed as suitable application specific entities as shown and described in FIG. 1/Q.1051, Ref. 6, noted above, in terms of the OSI Reference Model, "Data Networks and Open Systems Communications—Open Systems Interconnection: ITU-T Recommendations X.200," http://www.itu.ch/itudoc/itu-t/rec/x200.htm, Geneva, Switzerland: International Telecommunications Union (ITU), and all other CCITT and ITU-T Recommendations cited therein., Ref. 8, hereby are incorporated by reference, and in Ref. 6, noted above. The logical information flow between MAP application specific entities in two distinct mobile voice conference service nodes is as shown and described in FIG. 3/Q.1051 of Ref. 8, noted above. The mobile voice conference service of this invention requires that multiple application specific entities interact amongst themselves at the same time following the logical representation shown and described in FIG. 3/Q.1051, Ref. 8, noted above. Ref. 8, noted above, also delineates the general structure of peer-to-peer protocol among the various application specific entities for exchanging the specific messages required to implement the mobile conference service of this invention. These application specific entities, referring to FIG. 5, MCI 511, MCPM 512, MCFM 513, and MCMM 514, receive appropriate services from the connection management, mobility management, and radio resource management functional groupings, as defined Ref. 11, noted above.

The mobile application part, or MAP, signaling messages and procedures described and shown in Ref. 6, noted above, are used to locate, track, and provide mobile cellular radio services to the mobile telephones 343 and 343'. The MAP is also used for the hand-over procedure required when a roving mobile telephone 343 moves from the geographical Chakrabarti 1-2 21 confines of its home PCN 340 to the service area of another PCN 340 that is not its home PCN and is referred to as the currently serving PCN for the roving mobile subscriber, as discussed above. The mobile application part, as mentioned in Ref. 6, noted above, makes use of the services offered by the TCAP, Ref. 4, noted above, of SS7, Ref. 9, noted above. The implementation of the mobile voice conference service of this invention requires that the standard mobile applications part of Ref. 6 be extended appropriately with additional messages and message exchange procedures which are described below. In addition, preferably, the ISDN user part, or ISUP, described in these references is used for call setup and release within the Intelligent Network-Public Switched Telephone Network complex 310 320. Each MSC 341 and each switching center 321 of the PSTN 320 is assumed to be a network node with appropriate SS7 functions of TCAP, Ref. 5 above, of SCCP, Ref. 2 above, and of MTP, Ref. 1, above.

Referring to FIG. 5, the four essential functional elements of MCSF 510, MCI 511, MCPM 512, MCFM 513, and MCMM 514, are implemented as extensions to the standard mobility functions 530, as described in Ref. 11. The new messages and the associated exchange procedures for these messages in implementing MCSF of this invention are included below.

The mobile voice conference service of this invention is viewed as an extension to the standard voice conferencing service offered by the PSTN, or the standard "multiparty service" offered by the GSM, Ref. 11, noted above. Without loss of generality, this invention uses the PSTN voice conferencing model and requires that the voice conference must be prearranged; both a start time and a special dial-in number for the conference is advertised to all the potential participants. Referring to FIG. 4, In order to join the conference the participants, including the mobile subscribers with the mobile telephones 343 and 343', as well as fixed-location subscribers 410 associated with the PSTN 320, dial in to the special voice conference number.

A unique one of the mobile subscribers, referred to as the initiator, by means of radio signals sent from the initiators mobile telephone 343 or 343', requests the conference setup from the service provider and operator of the personal communication network 340 and eventually also pays for the conference service. Although, the conference cannot begin without the initiator being a participant, once the conference has begun with at least three participants including the initiator, disconnection of the initiator from the voice conference does not cause the conference to be dismantled automatically. The conference begins as soon as there is one other participant besides the initiator.

Any authorized subscriber is capable of joining the conference at any time during the session. The conference is capable of continuing only so long as there are at least two participants. If a conference has not been terminated while absent during an intentional withdrawal from the conference, a participant is enabled to rejoin the conference by redialing the same special voice conference number the participants dial to join the conference in the first instance. Preferably, if the conference has already been terminated, a mobile subscriber attempting to join or rejoin the voice conference is informed by prestored voice message that the conference is no longer in session.

Means are provided to automatically terminate the conference in response to certain conditions in addition to enabling both the initiator as well as any other mobile participant to intentionally terminate the voice conference.

Figure 6:
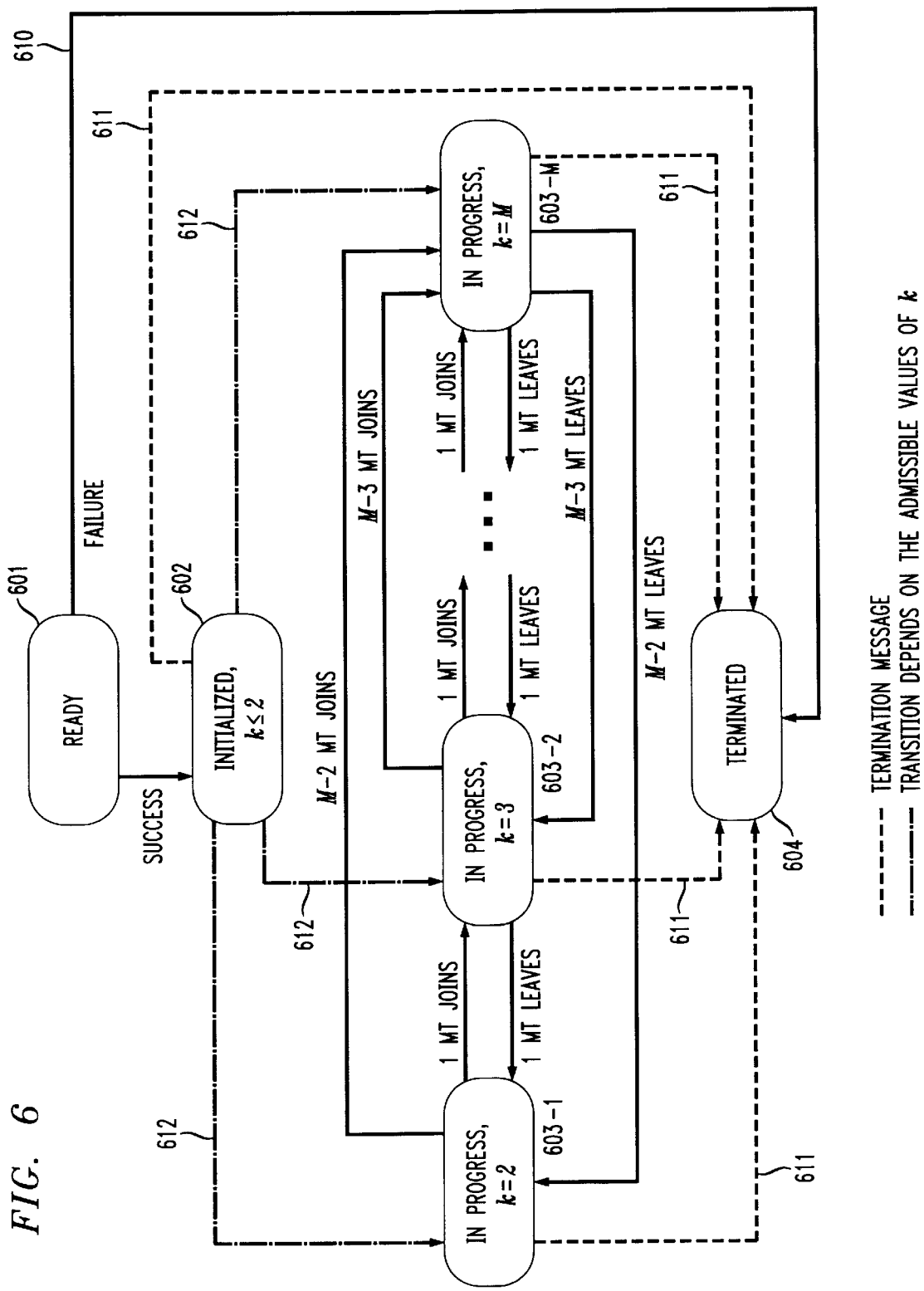
FIG. 6 is a finite state machine representation for the transition of various conference states in terms of the participants to the mobile voice conference service of this invention.

Referring to FIG. 6, a mobile voice conference conducted in accordance with the invention is represented as a finite state machine. The finite state machine has the following states: ready for conference, or ready 601, state; conference initialized, or initialized 602, state; conference in progress, or in progress, states 603-2 through 603-M for conference in progress with k participants, where k equals 2 to M, respectively, and where M equals a finite natural number; and a conference terminated 604 state. The abbreviation MT is represents a mobile unit, or mobile telephone 343 or 343', participating, joining and leaving the voice conference. Still referring to FIG. 6, the continuous dashed lines 611 represent entering the termination state 603 represent termination messages, the alternating dash and dot lines 612 entering the in progress states 603-2 through 603-M represent transitions which depend upon the admissible values of k, and the continuous line 610 represents the detection of a failure condition.

Figure 7:
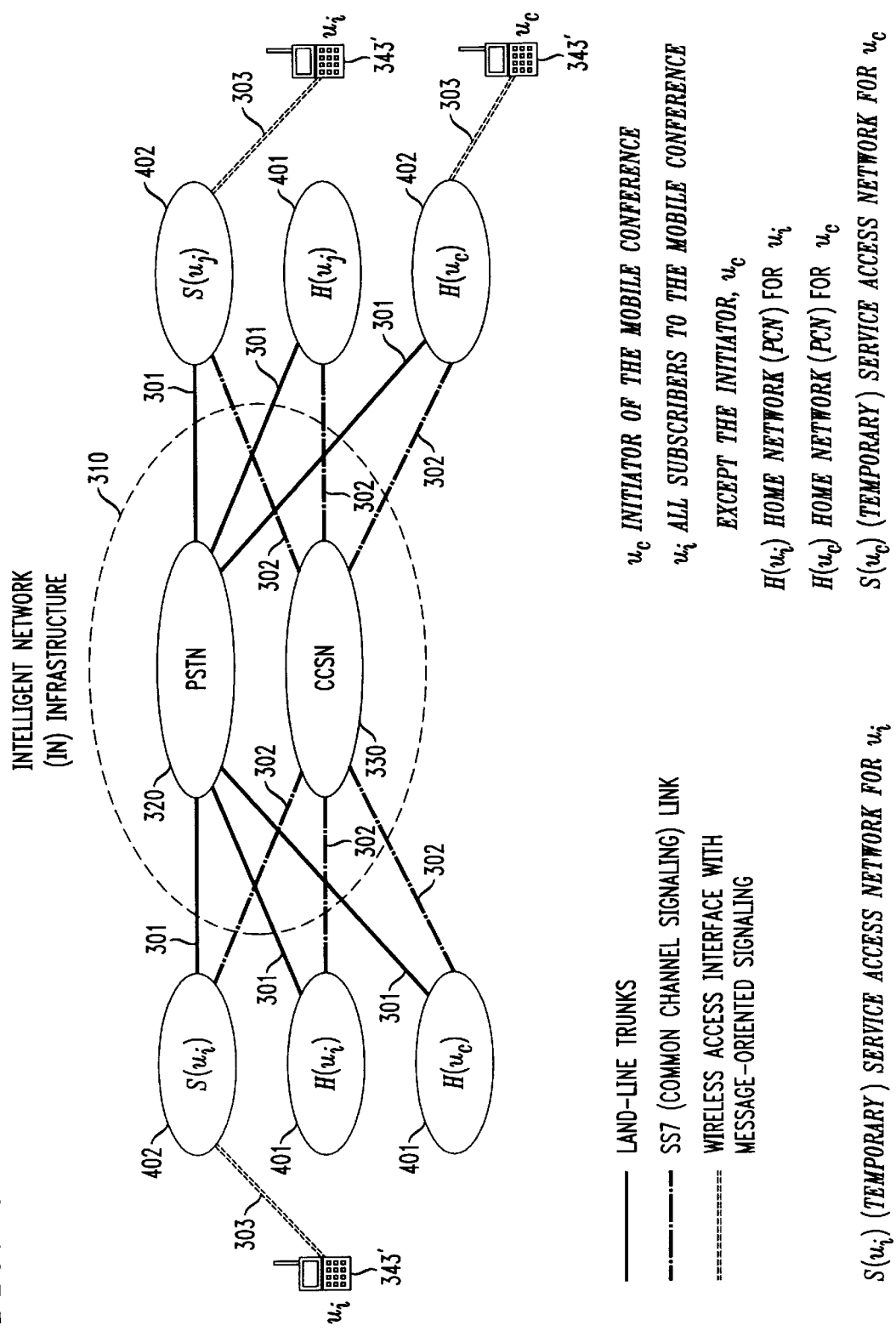
FIG. 7 illustrates the general communication relationship for the mobile voice conference service of this invention among the mobile telephones and their respective home and serving networks.

FIG. 7 illustrates the preferred form of the service access configuration of the mobile voice conference service of this invention among the mobile telephones, in the case of three roaming mobile telephones, or units, 343': the initiator participant $u_c$ and two other mobile voice conference participants $u_i$ and $u_j$. Each of the mobile telephones $u_c$, $u_i$ and $u_j$, is located outside of the geographical limits of their respectively associated home sub-networks $H(u_c)$, $H(u_i)$ and $H(u_j)$, and therefore cannot receive current service from their associated home networks. Accordingly, $u_c$, $u_i$ and $u_j$ must receive mobile telephonic service from the current service, or temporary service access subnetwork within the geographical service limits of which they are currently located: $S(u_i)$, $S(u_i)$ and $S(u_{i'})$, respectively. For reasons of simplicity, as mentioned above, each $H(u_i)$ or $S(u_i)$ subnetworks has one and only one of the plurality of MSCs 401 402 with which it is exclusively associated, and the same symbols are therefore used to represent both the personal communication network 340 and its associated exclusive MSC 341.

Figure 8:
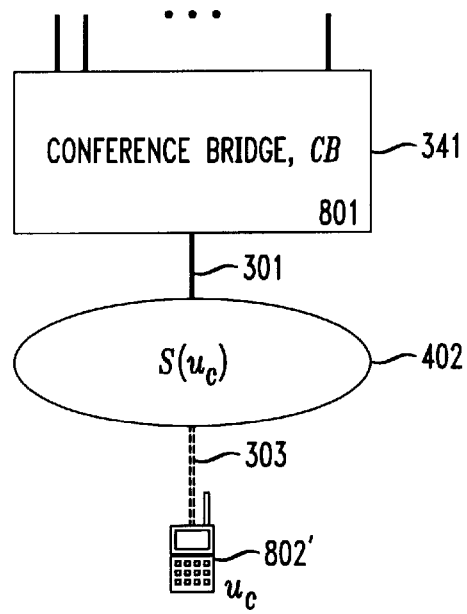
FIG. 8 is a representation of the voice connections in a conference in the "initialized" state of FIG. 6.

FIG. 8 is a representation of the logical connections among the various network elements and the specific mobile telephone 802 that is used by the initiator, $u_c$ 802, of the mobile voice conference when the mobile voice conference is in the initialized state 602 of FIG. 6. Referring to FIG. 8, a conference bridge, CB 801, is standard hardware for PSTN switching centers (321 of FIG. 3); in this invention, however, in addition to its standard hardware, the conference bridge present in a switching center of the mobile voice conference service network is also uniquely identifiable with a SS7 network address. In this invention, without loss of generality, a conference bridge and the switching center it belongs to, both represented by the same symbol, CB 801, are assumed to be endowed with the unique network address as an element of the common channel signaling network.

Figure 9:
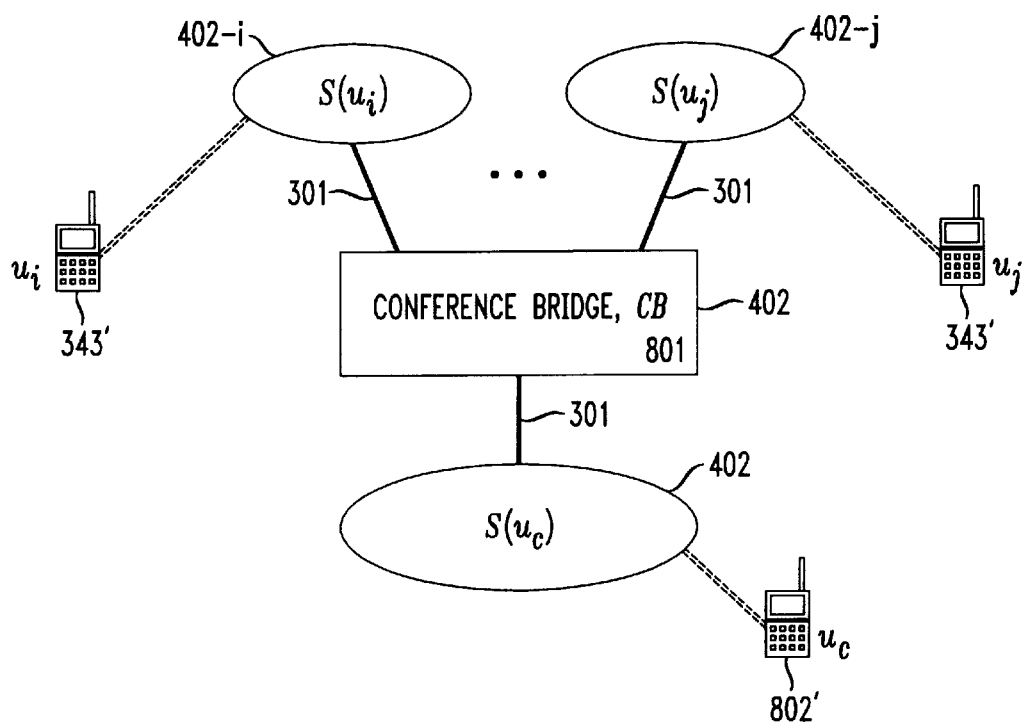
FIG. 9 is a representation of the voice connections in a conference in one of the "in progress" state of FIG. 6.

FIG. 9 is a representation of the logical connections among the various network elements, the specific mobile telephone 802 that is used by the initiator, $u_c$ 802, of the mobile voice conference, and of the specific mobile telephones 343 or 343' for other mobile voice conference participants when the mobile voice conference is in one of the "in progress states" 603 of FIG. 6.

In accordance with the invention, if a mobile participant with a mobile telephone 343 or 343' loses a conference connection involuntarily, the mobile voice conference service network restores it quickly and transparently, i.e., automatically and quickly without any action from the mobile participant with the lost connection. The mobile participant with the lost connection is not required to redial the special voice conference number or to take any other action in order to rejoin the conference. This is accomplished by providing the mobile voice conference service network with the means for detection of the event of a mobile participant to a voice conference being accidentally disconnected from the conference and the identity of the disconnected participant. Upon such detection of a lost connection, means provided within the mobile voice conference service network automatically sends a message on behalf of the disconnected mobile participant to the switching office containing the conference bridge equipment 801 employed for the conference to automatically reestablish connection of a port of a conference bridge 801 with the disconnected mobile conference subscriber. Preferably, after a pre-selected maximum number of unsuccessful attempts at reestablishing connection with the disconnected mobile participant no further attempts to reestablish the connection automatically are made, and then the burden of reestablishing the connection is placed onto the disconnected participant. Likewise, regardless of the number of unsuccessful attempts to reestablish the connection, if reconnection is not established within a preselected time period after the first unsuccessful attempt, further attempts to reestablish the connection are terminated. In addition, in order to reduce the potential for wasted network resources, the mobile voice conference service network is caused to terminate immediately the conference if the number of participants drops below two, even if the loss of users leading to this condition is only accidental.

The integrity of multipoint connections is automatically maintained throughout the duration of the conference by the mobile voice conference service network during hand-over of mobile telephones moving between the various geographical service areas of the various personal communication network, without any action required from the mobile participants, by following the standard methods, for example, those shown and described in Ref. 11, noted above.

Figure 10:
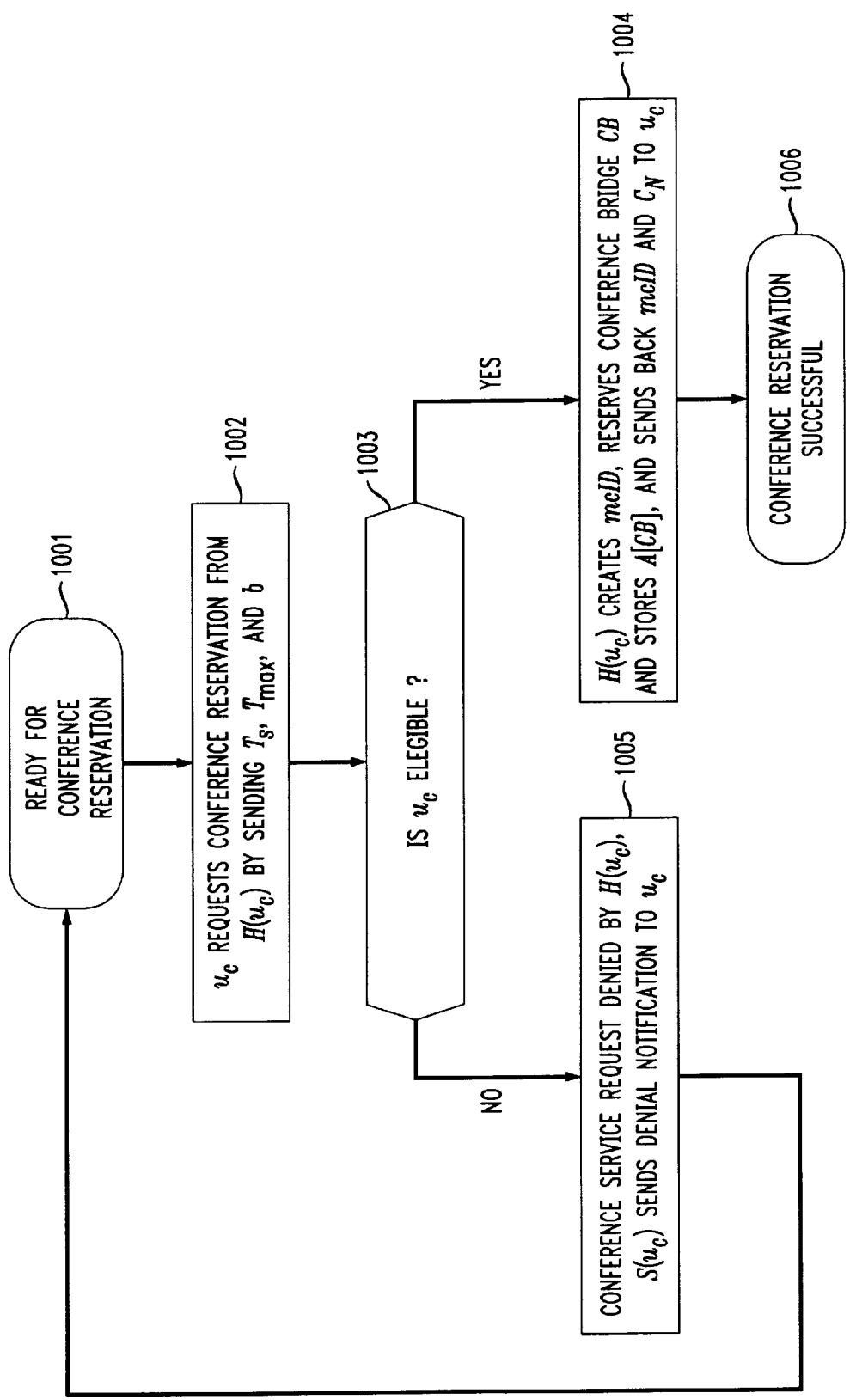
FIG. 10 is a logic flow chart of the preferred method of conference reservation for a mobile voice conference of this invention.

Referring to FIG. 10, in the preferred operation of the mobile voice conference service of the invention, at some time before the beginning of the conference itself, the initiator, $u_c$, following the standard operational practices of PSTN, communicates with its home network, $H(u_c)$, to make a "conference reservation." The conference reservation 1002 consists of scheduling the conference to begin at a future instant, $T_S$, for a maximum duration $T_{max}$ and with a maximum of b initial participants. If $u_c$ is eligible 1003 to receive the mobile voice conference service of this invention, $H(u_c)$ creates and stores a unique mobile conference identity, mcID 1004, which is used as a unique reference that persists for the duration of the specific mobile voice conference and is recognized by the mobile voice conference service network to be referring to a specific conference that has not yet begun, and is used as an unambiguous reference for the specific mobile voice conference to all other network elements. Observe that $H(u_c)$ will deny service to $u_c$ if $u_c$ is not eligible to receive conference service, and no mcID will be created 1005. $H(u_c)$ will also reserve the necessary conference bridge equipment 1004 at some appropriate node CB of the mobile voice conference service network to ensure that a conference bridge with b ports will be available at the instant $T_S$. This "conference reservation phase," ends with $H(u_c)$ sending to $u_c$ a specific PCN number, $C_N$, to be used for dialing into the conference by all participants 1004. The initiator is expected to notify all other potential participants that they must use $C_N$ to dial into the conference.

In the following discussion of the essential new messages introduced to describe the mobile voice conference service of this invention, the prefixes un, n, and nu are used to distinguish the user-to-network, within the network, and network-to-user messages, respectively.

FIG. 11 represents a logic flow chart of the preferred method of initializing a mobile voice conference of this invention, as indicated earlier by the functional block MCI, FIG. 5, 511. A mobile voice conference begins at $T_S$ with the network at the "Ready" 601 state; following the standard PSTN practice, the conference is not allowed to start earlier. The initiator $u_c$ starts with the standard procedures for authentication, service validation, registration, etc., Ref. 11., noted above, from $S(u_c)$ using the subscriber profile information for $u_c$ stored at $H(u_c)$. At the end of this step, $u_c$ sends a user-to-network conference set-up request message, unCSR, 1101 to $S(u_c)$, which contains the unique mobile conference identifier, mcID, previously received from the provider of the mobile conference service during the earlier conference reservation phase 1004, and the unique PCN identifier of the mobile telephone, Ref. 11, noted above, of $u_c$, uID($u_c$). Following the standard procedures, for example as described in Ref. 11, noted above, $S(u_c)$ uses uID($u_c$) to identify $H(u_c)$, and then sends a network-to-network conference set-up request message, nCSR, to $H(u_c)$ containing mcID, uID($u_c$), and the CCSN address of $S(u_c)$, A[$S(u_c)$] 1102. $H(u_c)$ uses mcID to retrieve the conference reservation information for $u_c$, including the start time of the conference, $T_S$, the maximum duration, $T_{max}$, and the CCSN address, A[CB], of the network node containing the conference bridge 801 to be used in exchanging SS7 messages between $S(u_c)$ and CB 801, and sends these information elements back to $S(u_c)$ using a network-to-network conference set-up confirm message, nCSC, 1103. $S(u_c)$ stores $T_{max}$, $T_S$, and A[CB] that are collectively associated with the specific value of mcID 1104 for the duration of the conference. $S(u_c)$ then sends a network-to-network conference bridge activation request message, nCBAR, to the switching center containing the conference bridge, CB, which includes mcID, $T_{max}$, uID($u_c$), and A[$H(u_c)$] 1105. CB and $S(u_c)$ use SS7 signaling to set up a standard PSTN voice connection between $u_c$ and the conference bridge, and the conference bridge starts measuring the duration, $T_{dur}$ of the conference from an appropriate instant after this instant 1105.

The ability to recover automatically from various extraordinary conditions requires that enough information is known about the global state of the conference, $G_S$, FIG. 12, 1201, at any given instant during the mobile voice conference to access appropriate network elements at all times in order to reestablish a lost connection. The needed information includes the following, FIG. 12, 1201: (1) mcID, (2) a time-stamp, $T_c$, containing the instant when this specific $G_S$ is created or updated; (3) k, the number of currently active participants, (4) uID( $u_i$), for each participant $u_i$ connected to the conference, including the initiator, at $T_c$; (5) type of each aim identifying whether $u_i$ is either a mobile telephone subscriber to the mobile voice conference, or is a mobile telephone which is not a subscriber to the mobile voice conference, or is fixed location PSTN telephone; (6) A[S($u_i$)], for each $u_i$ as above, where for each PSTN telephone A[S($u_i$)] corresponds to the SS7 network address of an appropriate PSTN switching center, as required by the standard procedures; (7) A[H($u_1$)], for each $u_i$, where for each PSTN telephone, A[H($u_i$)] is set to be the same as A[S($u_i$)]; (8) A[CB], (9) the status of each distinct connection segment between S($u_i$)'s and CB, (10) the status of each distinct connection segment between S($u_i$) and $u_i$, and (11) the duration of the conference, $T_{dur}(U_1)$, up to $T_c$, for each $u_i$ where the total duration of the conference, $T_{dur}$, is defined as $T_{dur} = _{df}\max(T_{dur}(u_1), \ldots, T_{dur}(u_k))$. The status of the connection segments, FIG. 12, 1202, admit three possible alternatives: (1) Active; (2) Dismantled, owing to actions initiated by $u_{ij}$ to leave the conference, and (3) Inactive, for other, network-originated reasons, including failures and hand-over.

Recall that at this stage $u_c$, is the only participant to the conference. Referring to FIG. 11, CB now creates the initial global state information $G_S$ 1105, consisting of the following: (1) mcID, (2) time-stamp, $T_c$, (3) k=I, (4) uID($u_c$), (5) type of $u_c$ (mobile conference participant); (6) A[S($u_c$)], (7) A[H($u_c$)], (8) A[CB], (9) the status of the connection between S($u_c$) and CB, (10) the status of the connection between S($u_c$) and $u_c$, and (11) sets $T_{dur}(u_1)=0, T_{dur}(u_k)=0, \ldots T_{dur}=0$, and sends $G_S$ to both H($u_c$) and S($u_c$) 1105 using a network-to-network global state update message, nGSU. With $G_S$ received by both H($u_c$) and S($u_c$), the conference enters the "Initialized" state 1106.

Figure 13:
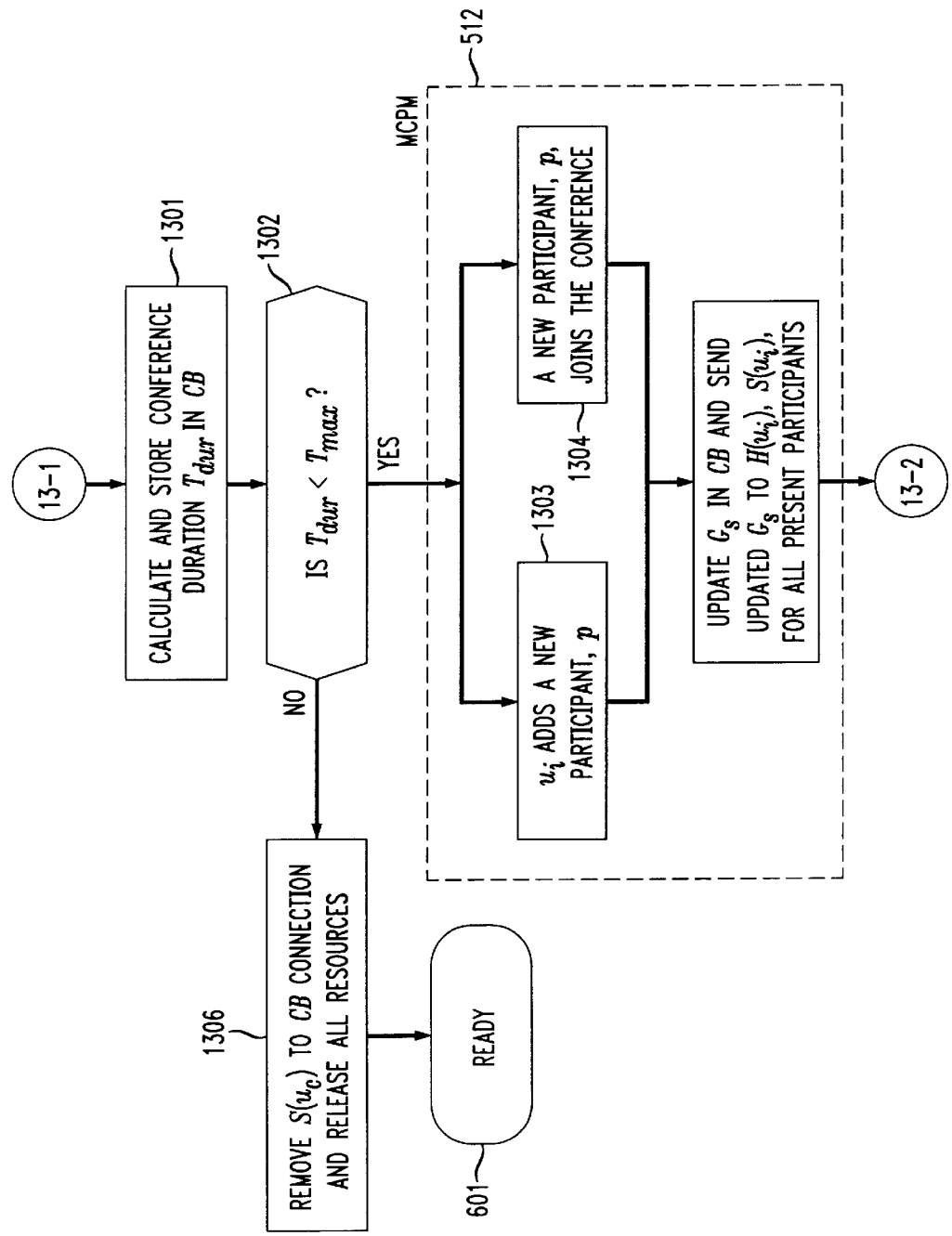
FIGS. 13 and 14 form a composite logic flow chart of the preferred method of maintaining and terminating a mobile voice conference of the present invention.
Figure 14:
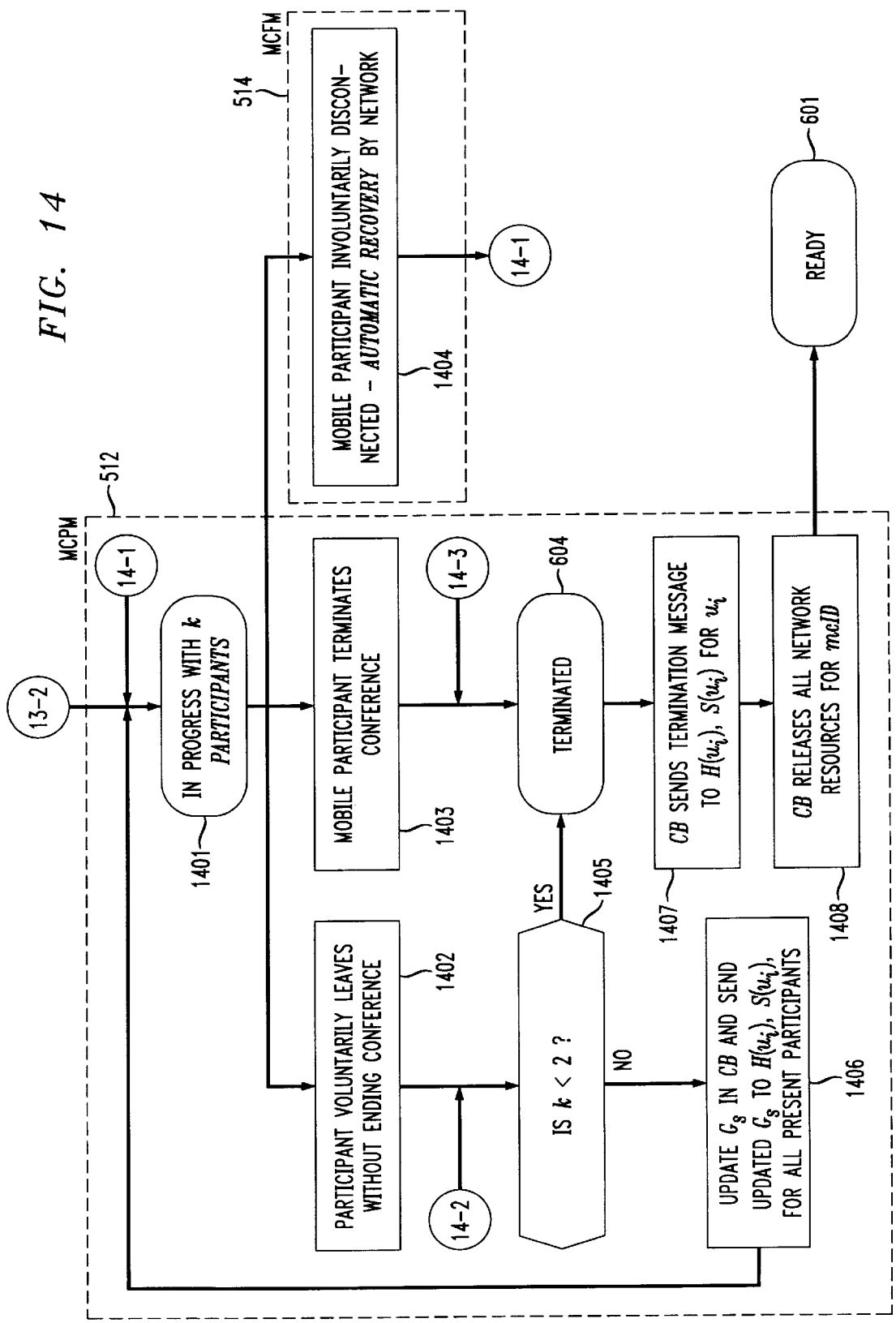

FIG. 13 and FIG. 14 collectively include a logic flow chart of the preferred method of maintaining and terminating a mobile voice conference, which includes the automatic connection recovery functions of MCFM 513. Referring to FIG. 13, the conference duration is initialized and stored by CB 1301 in the "Initialized" state. If $T_{dur}$ is less than $T_{max}$, the conference proceeds further 1301; otherwise, the S($u_c$) to CB connection is removed and all pertinent network resources are released following the standard procedures, Ref. 11, noted above, 1306. Whenever a participant joins or departs the conference, $G_S$ is updated and sent to each H($u_i$) and S($u_i$) for each respective current participant $u_i$ to the conference 1303 and 1304.

Still referring to FIG. 13, all conference sessions are of finite duration. The mobile voice conference service network uses the standard PSTN procedures to track $T_{dur}$ in CB 1301, and terminates the conference as soon as $T_{dur}$ reaches $T_{max}$ 1302 and 1306. Additionally, the network is provided with a termination procedure which ensures that if the number of participants falls to only one for a pre-selected time period, the conference is automatically terminated, regardless of whether the maximum allowable time duration for the conference has lapsed, FIG. 14, 1405.

FIG. 13 and FIG. 14 collectively include a logic flow chart of the preferred method of participation management, for a mobile voice conference of this invention, as indicated earlier by the functional block MCPM, FIG. 5, 512. There are four scenarios to consider: $u_i$ adds a new participant, p, 1303; (2) a new participant, p, joins the conference on its own 1304; (3) $u_i$ leaves the conference voluntarily; and (4) $u_i$ chooses to terminate the conference. These are presented below in sequence.

Combining FIG. 3 and FIG. 4, in accordance with the invention, the fixed location PSTN subscribers 410 are also capable of becoming participants to the mobile voice conference. However, the service available to them is similar to the PSTN service presently available in which they must redial in the event of a disconnection from the conference in order to rejoin the conference. In particular, the PSTN subscribers 410 are not allowed to add any new participant to a conference.

Figure 15:
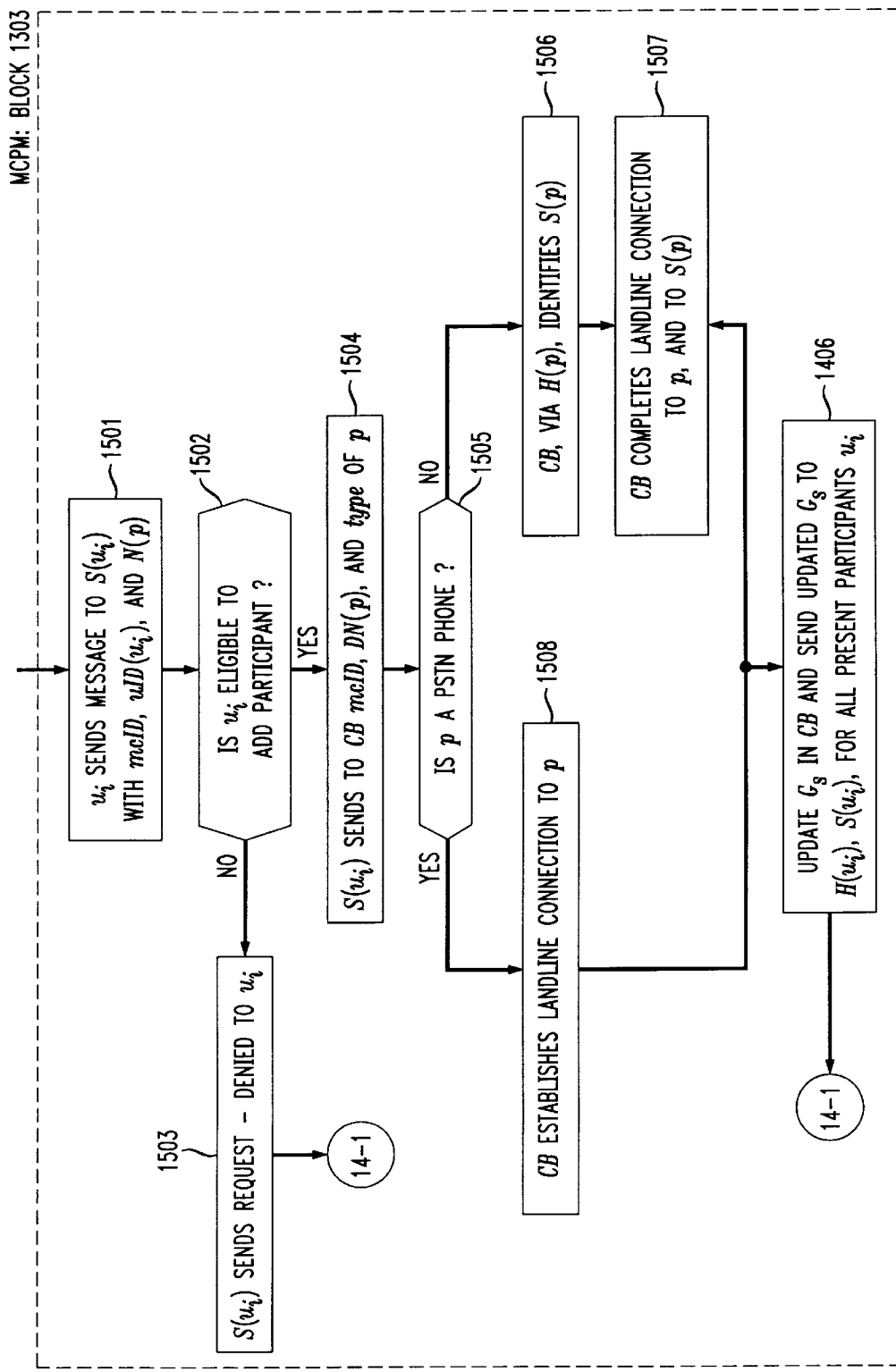
FIG. 15 is a logic flow chart of the preferred method of adding a new participant, p, by an existing conference participant to the mobile voice conference of this invention.

As part of mobile conference participation management, FIG. 13, 512, FIG. 15 represents a logic flow chart of the preferred method of adding a new participant, p, to a mobile voice conference of this invention, by any of the subscribers to the mobile voice conference service which is also an existing participant to the conference with the unique identifier, mcID, and by such subscribers only, FIG. 13, 1303. Such a mobile conference -participant, $u_i$, sends to S($u_i$) a user-to-network add-new-participant-request message, unANP, including the information elements uID ($u_i$), mcID and DN(p) 1501, where DN(p) is the usual digit string as the PCN or PSTN number, used byp, that is uniquely associated with a specific mobile telephone, or a fixed location telephone, respectively. Using the standard methods, S($u_i$) verifies with H($u_1$.) whether $u_i$ is indeed eligible to add a new participant 1502. If the answer is negative, a network-to-user join request denial message, nuJRD, is sent by S($u_i$) to $u_i$, and the global state information $G_S$ remains unchanged 1503.

Still referring to FIG. 15, if $u_i$ is determined to be eligible to add a new participant, S($u_i$) sends to CB a network-to-network add-to-conference message, nAC, including the information elements, mcID, DN(p), and the type of p (indicating whether p is a mobile telephone or a fixed location PSTN telephone obtained by examining the digit-string DN(p)(in the absence of this indicator, CB will have to determine for itself whether p is a mobile telephone or a fixed location telephone) 1504. If p is a fixed-location PSTN subscriber, FIG. 4, 410, CB establishes the land-line connection with p using the standard procedures 1508. If p is a mobile telephone, then CB, in conjunction with H(p), identifies S(p) 1506. CB then completes the land-line connection from CB top, and from CB to S(p), thus completing a voice path from $u_i$ to p, using standard methods, Ref. 11, noted above, 1507. Immediately afterwards, CB updates $G_S$ with the pertinent information for p and sends the updated global state information via nGSU to all H($u_i$) and S($u_i$), including those for p 1406, thus completing the addition of a new participant.

Figure 16:
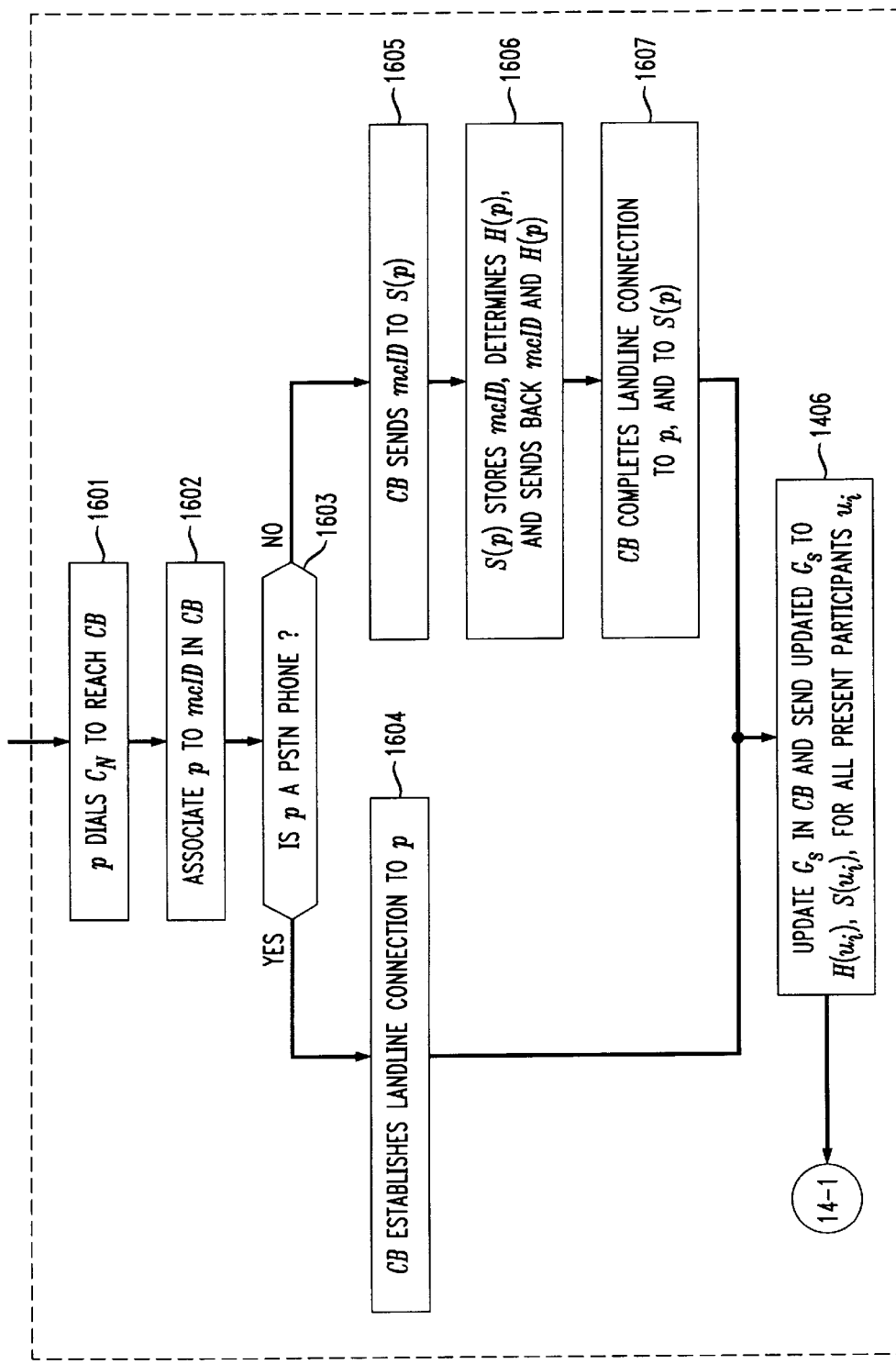
FIG. 16 is a logic flow chart of the preferred method for a new participant, p, joining on its own the mobile voice conference of this invention.

As part of mobile conference participation management, FIG. 13, 512, FIG. 16 represents a logic flow chart of the preferred method for a new participant, p, to join on its own a mobile voice conference of this invention, FIG. 13, 1304. The new participant reaches CB by dialing the conference number $C_N$ 1601 as a result of which CB upgrades its table of association by including that of p and mcID 1602. If p is a PSTN phone, CB establishes a land-line voice connection to p using standard procedures. On the other hand, if p is a mobile telephone, CB sends the mcID of the mobile voice conference to S(p) 1605 using a network-to-network conference-identifier information message, nCH. S(p) stores mcID, determines H(p) using the standard PCN methods, for example, Ref. 11, noted above, and then sends back mcID and H(p) 1606 to CB. Immediately afterwards, CB completes the land-line voice connections to p and to S(p) 1607.

Regardless of the type of p, immediately after establishing the connection with p, CB updates $G_S$ with the pertinent information for p and sends the updated global state information using nGSU to all $H(u_{i,j})$ and $S(u_i)$, including those for p 1406.

Figure 17:
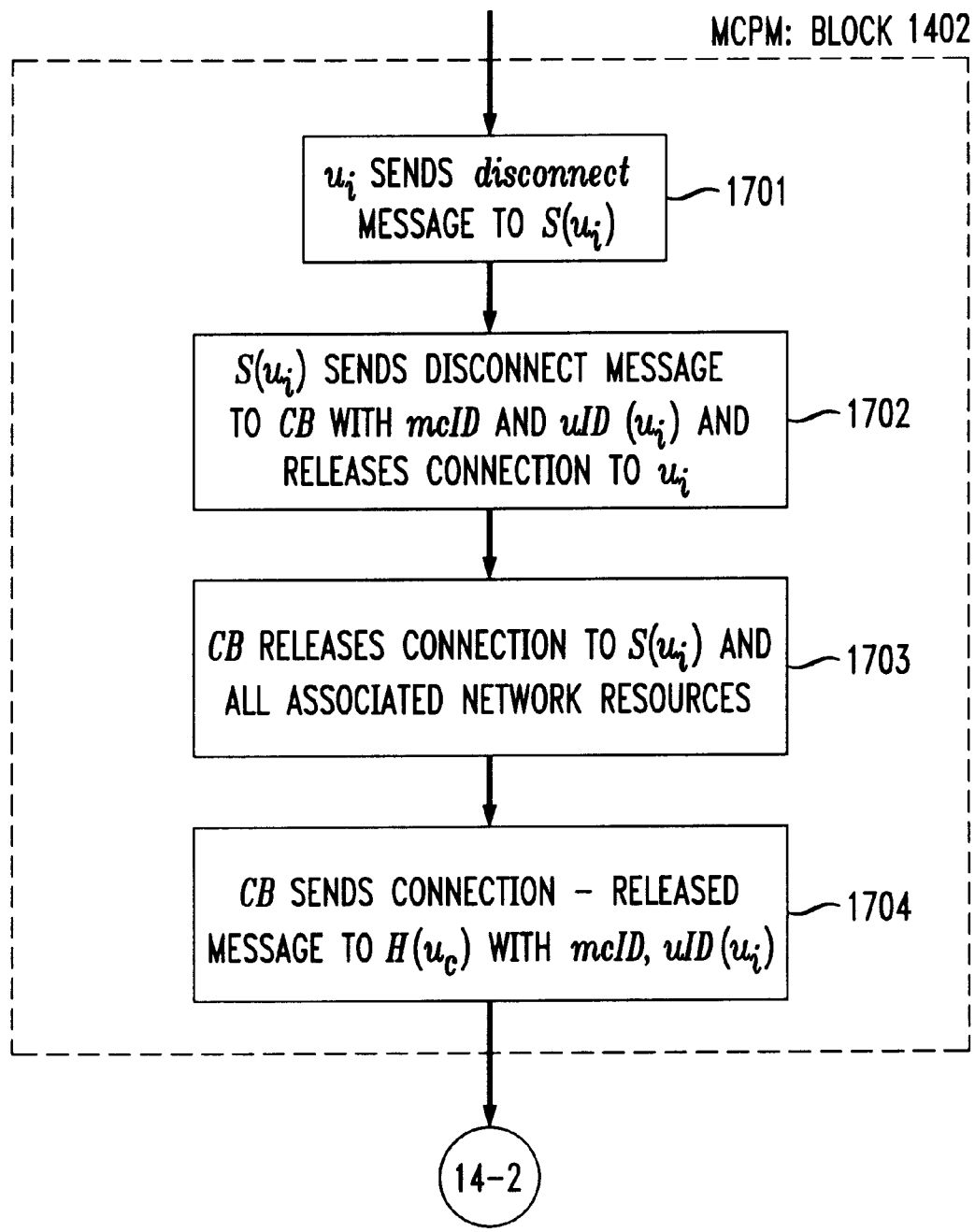
FIG. 17 is a logic flow chart of the preferred method for a participant to leave voluntarily without terminating the mobile voice conference of this invention.
Figure 18:
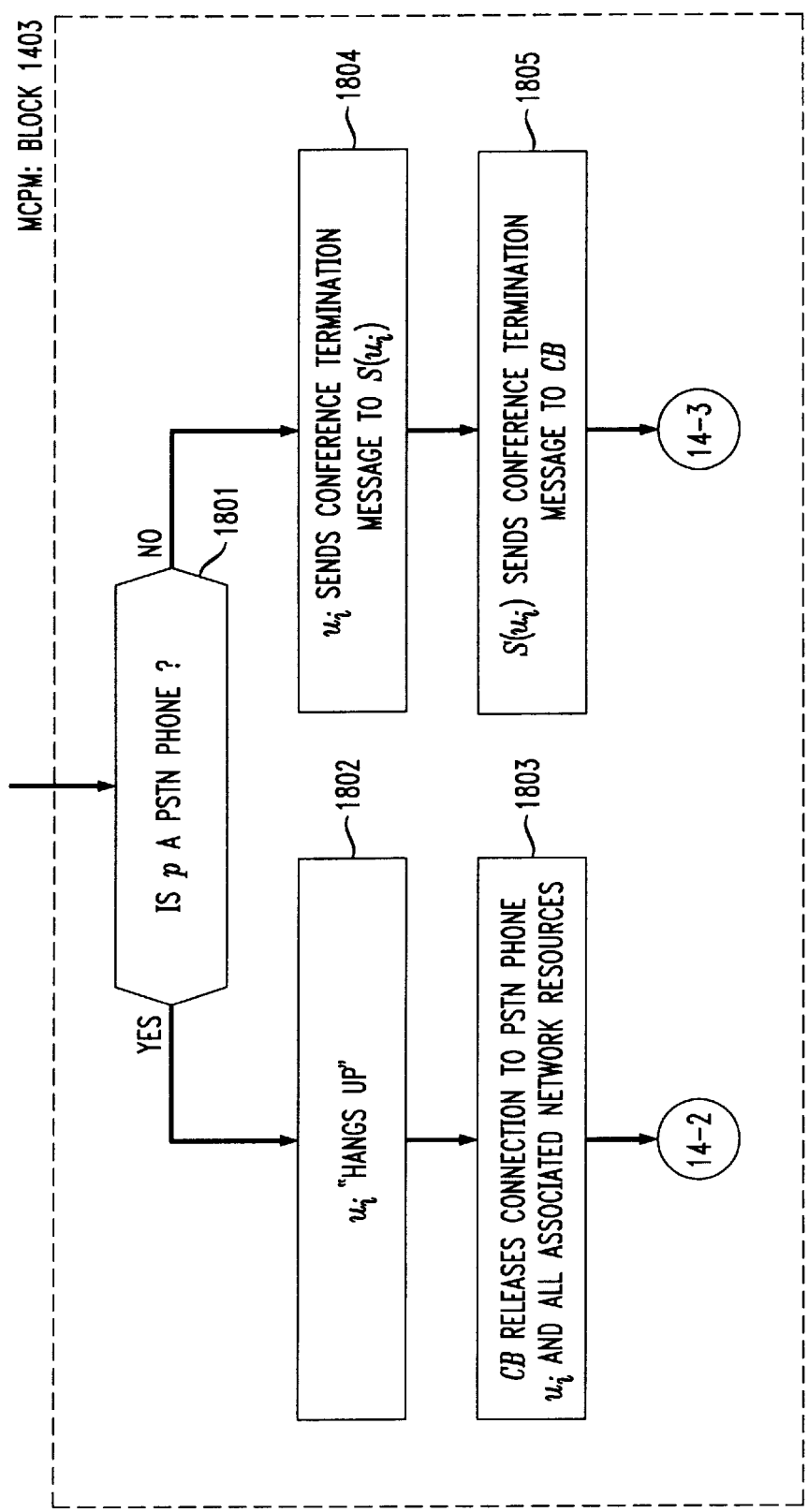
FIG. 18 is a logic flow chart of the preferred method for a mobile conference participant to terminate the mobile voice conference of this invention.

As part of mobile conference participation management, FIG. 14, 512, FIG. 17 represents a logic flow chart of the preferred method for an existing participant, $u_i$, to exit voluntarily a mobile voice conference of this invention, FIG. 14, 1402, without terminating the conference. If $u_i$ is a fixed-location PSTN phone, then the usual "on-hook" indication is sent to CB, causing CB to release all network resources associated with the voice connection from CB to $u_i$ 1701. If $u_i$ is a mobile telephone, it sends a user-to-network conference-exit request message, unCER, to $S(u_i)$ (the mobile telephone designer preferably chooses to build in to the mobile telephone the ability to send this message for the user to having to dial a special code; as long as the mobile telephone recognizes itself to be in a "connected-to-a-conference" state, it can send out the conference exit request message unCER whenever $u_i$ presses the "END" or even the "POWER" button on its mobile telephone). Observe that while a PSTN fixed location participant, such as one associated with SC 321, FIG. 4, 410, is not permitted to terminate the conference, it can leave the conference at its discretion. No special restriction is imposed upon the mobile telephones $u_i$ and even the initiator can leave the conference without ending the conference by this method.

Still referring to FIG. 17, upon receiving the user-to-network conference-exit message, unCER, from $u_i$, $S(u_i)$ sends a network-to-network conference-disconnect request message, nCDR, to CB with mcID and uID($u_i$) and releases the connection to $u_i$. As the next step, CB releases the connection to $S(u_i)$ and all network resources associated with this connection 1703. CB then sends a network-to-network conference-connection-released message, nCCR, containing the information elements mcID and uID( $u_i$) to $H(u_c)$ 1704 for charging and billing purposes as determined by the provider of the conference. Returning to FIG. 14, CB then determines whether there are at least two participants still connected to the conference 1405. If only one participant is present, then the conference moves to the "Terminated" state, 604, CB sends a network-to-network conference termination message, nCT, to $H(u_i)$ and $S(u_i)$ for the only participant $u_i$ 1407, and then releases all network resources associated with the mobile voice conference identified by mcID. On the other hand, if two or more participants are present 1405, then CB updates the global state information and sends the updated $G_S$ to $H(u_i)$, and $S(u_i)$ for all current participants, $u_i$ 1406 using nGSU. The mobile voice conference then returns to the "In Progress with k participants" state for the updated value of k.

As part of mobile conference participation management, FIG. 14, 512, FIG. 343 represents a logic flow chart of the preferred method for an existing mobile voice conference participant, $u_i$, to end a mobile voice conference of this invention, FIG. 14, 1403. If $u_i$ is a fixed-location PSTN phone, then the usual "on-hook" indication is sent to CB 1802, causing CB to release all network resources associated with the voice connection from CB to $u_i$ 1803; CB then returns to FIG. 14, connector 14-2, either to update $G_S$ or terminate the conference, depending on whether k≧2 or not, respectively. If $u_i$ is a mobile telephone, it sends a user-to-network conference-termination message, unCT, to $S(u_i)$ 1804 with mcID and uID($u_i$), following which $S(u_i)$ sends a network-to-network conference-terminated-by-participant message, nCTP, with mcID to CB, and the mobile voice conference enters the "Terminated" state, FIG. 14, connector 14-3, 604. Observe that $u_i$ is required to send the user-to-network conference-termination message, unCT, to $S(u_i)$ 1804 to initiate the conference termination process; in the absence of this message, the conference will continue.

Observe that a participant who leaves the conference for a certain period of time, is capable of rejoining the conference if the conference has not already been terminated. In accordance with one aspect of the invention, after a conference has terminated and thus cannot be rejoined, a prospective participant attempting to join or rejoin the terminated conference is informed by prerecorded voice message at the discretion of the provider of the mobile voice conference service that the conference is no longer in session.

FIGS. 15, 16, 17 and 18 collectively present the representative logic flow chart for mobile conference participation management, FIG. 5, 512, as discussed above.

Mobile conference failure management 513 provided in accordance with the invention is concerned with the event when the connection to a conference participant at a mobile telephone 343 is lost. In such case, a determination is made as to whether the mobile participant deliberately elected to discontinue participation in the conference or whether the disconnection was due to some other cause.

In the first case the mobile voice conference service network 300 takes no restorative action, and in the second case, the connection is automatically and transparently restored by the mobile voice conference network. Because a mobile user $u_i$ intentionally leaves a conference either by sending an explicit conference exit or termination message, unCER or unCTR, respectively, in the absence of receipt of either of these messages the mobile voice conference service network 300 of the invention assumes that the connection to the mobile user has been lost for other reasons, Loss of a conference connection for any reason by a fixed location participant associated with the fixed switching center 321, is presumed to have been done voluntarily, and no attempt is made to reestablish the conference connection.

Figure 19:
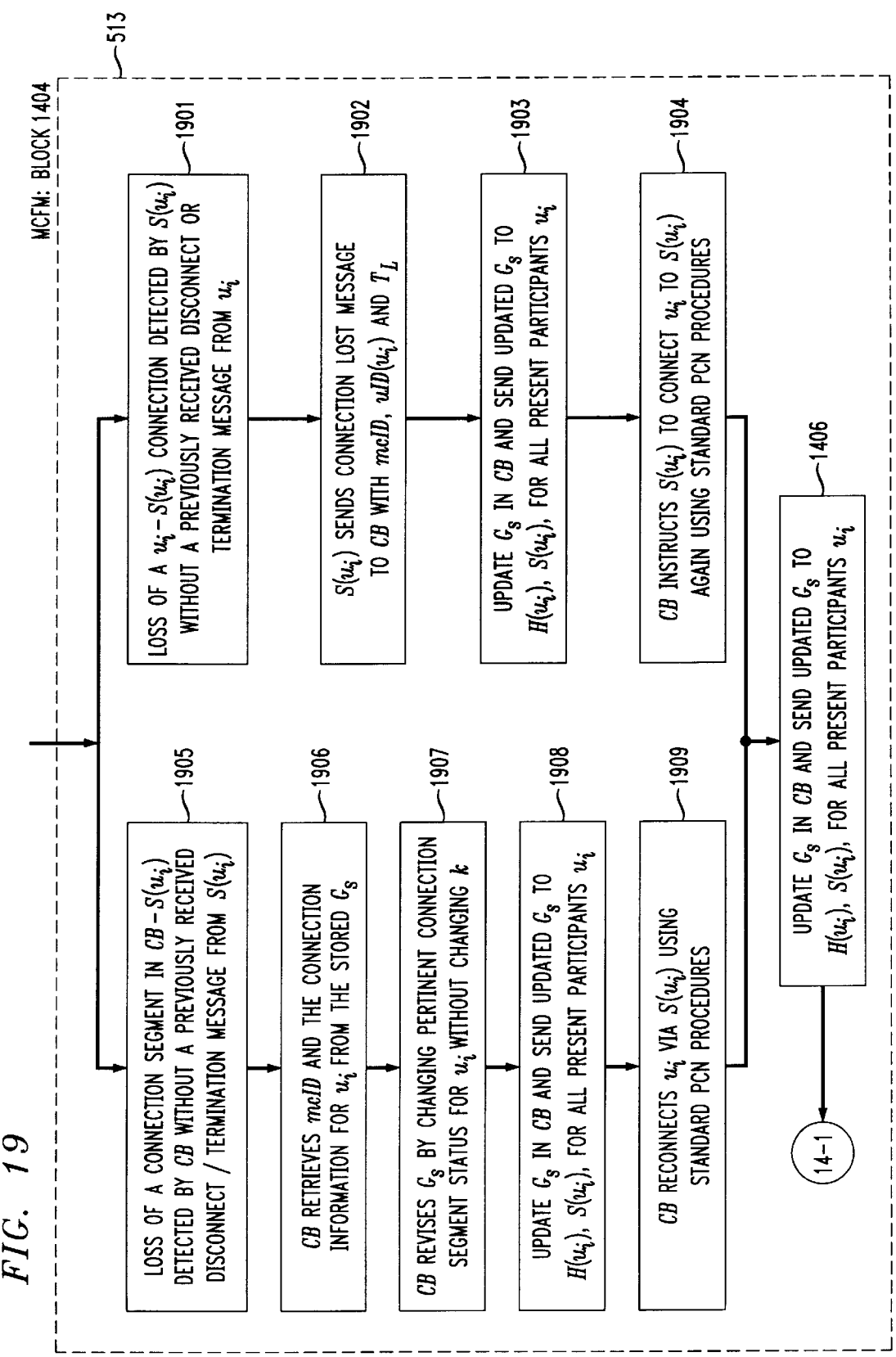
FIG. 19 is a logic flow chart of the preferred method for failure management for the mobile voice conference of this invention.

FIG. 19 represents a logic flow chart of the preferred method for the mobile conference failure management (MCFM) functions, FIG. 5, 513, which provide automatic connection recovery to a mobile voice conference participant, $u_i$ in the case of a loss of connection owing to a network-originated connection failure event (including radio access failures). Two type are considered in sequence: the Type 1 connection loss is when the loss of the connection from $S(u_i)$ to $u_i$ is detected by $S(u_i)$ 1901 without a previously received user-to-network conference exit or termination message, unCER or unCTR, respectively, from $u_i$; the other, Type 2 connection loss, is when the loss of a connection segment in the CB-to-$S(u_i)$ voice connection is detected by CB without a previously received network-to-network conference exit or termination message, unCER or unCTR, respectively, from $S(u_i)$ for a certain user $u_i$ 1905. These are considered in sequence.

Still referring to FIG. 19, upon detection of a Type 1 connection loss 1901, $S(u_i)$ sends a network-to-network Type-1-connection-lost message, nCL1, to CB with the information elements mcID, uID( $u_i$), and a time-stamp, $T_L$, indicating the time instant when the loss of connection was detected 1902. The time-stamp $T_L$ is used in CB to update $T_{dur}(u_i)$, and then the updated $G_S$ is sent by CB to $H(u_i)$ and $S(u_i)$ for all present participants, including those for the specific mobile telephone $u_i$ for which the connection was lost 1903. Using standard PCN procedures, Ref. 11, noted above, CB instructs $S(u_i)$ to reconnect $u_i$ to $S(u_i)$ 1904. Once the connection reestablishment has been completed and confirmed by $S(u_i)$ using the standard PCN procedures, CB again updates $G_S$ and sends this updated $G_S$ to all $H(u_i)$ and $S(u_i)$ 1406. The mobile voice conference remains in the "In Progress with k participants" with k remaining unchanged before and after the connection loss.

Figure 20:
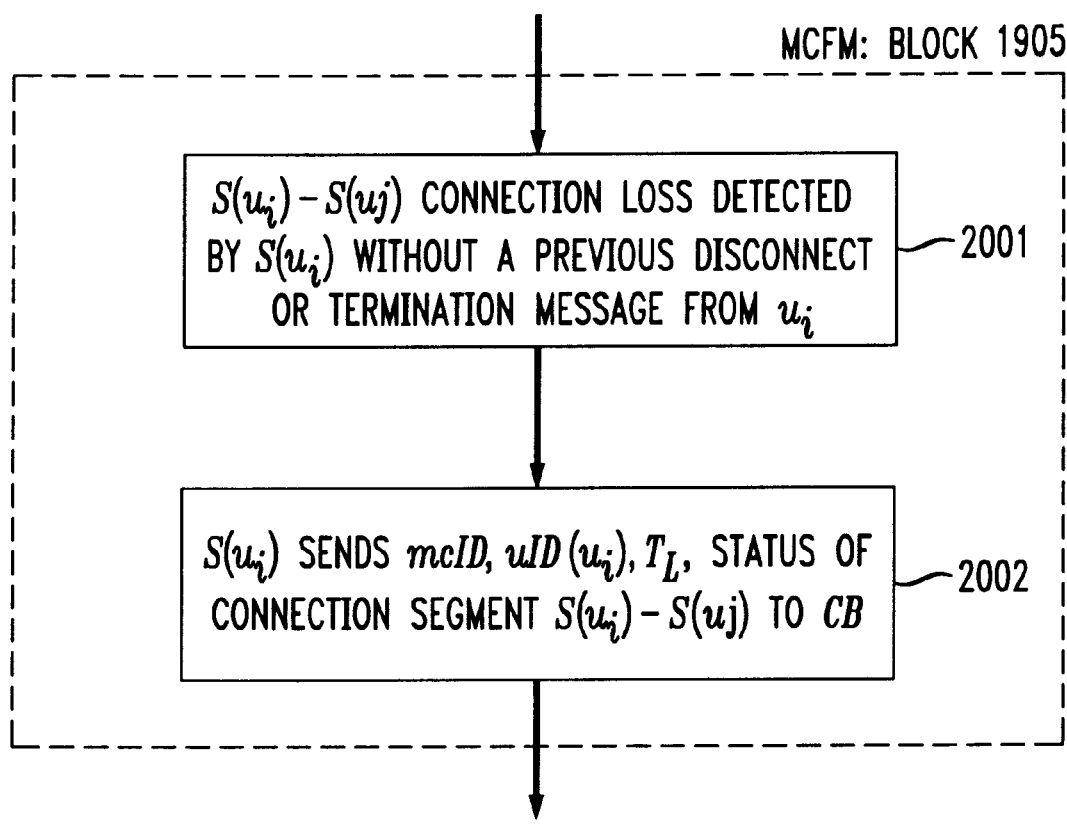
FIG. 20 is an expansion of some functions of FIG. 19 as part of the logic flow chart of the preferred method for failure management for the mobile voice conference of this invention.

Still referring to FIG. 19, a Type 2 connection loss 1905 corresponds to a loss of one or more connection segments in the voice connection from CB to $S(u_i)$. To be more specific, assume that lost connection segment is that between $S(u_i)$ and $S(u_j)$, for some arbitrary $j, i \neq j$. $S(u_i)$ (and also $S(u_j)$) detects the connection loss as part of the standard operation and maintenance procedures, recognizes that this event was not preceded by a valid user-to-network conference termination or disconnect message, unCER or unCTR, respectively, from $u_i$, FIG. 20, 2001, and as a consequence, $S(u_i)$ sends to CB a network-to-network Type-2-connection-segment-lost message, nCL2, with the information elements. mcID, uID($u_i$), the status for the voice connection segment $S(u_i)$–$S(u_j)$, and the time-stamp, $T_L$, indicating the time instant when the loss of connection was detected FIG. 20, 2002, where FIG. 20 is an expanded representation of 1905. As for the Type 1 connection loss, here also, the time-stamp $T_L$ is used in CB to update $T_{dur}(u_i)$. CB retrieves the last stored global state information for mcID 1906, and updates $G_S$ by revising the pertinent information elements specific to $u_i$ without changing the number of current participants, k, 1907. By using nGSU, the updated $G_S$ is then sent by CB to $H(u_i)$ and $S(u_i)$ for all present participants, including those for the specific mobile telephone $u_i$ for which the connection was lost 1908. Using standard PCN procedures, Ref. 11, noted above, CB reestablishes the connection to $S(u_i)$. Once the connection reestablishment has been completed and confirmed using the standard PCN procedures, Ref. 11, noted above, by $S(u_i)$, CB again updates $G_S$ and sends this updated $G_S$ to all $H(u_i)$ and $S(u_i)$ 1406 by using nGSU 1909. As for the Type 1 connection loss, here also the mobile voice conference remains in the "In Progress with k participants" with k remaining unchanged before and after the connection loss.

FIG. 19 and FIG. 20 collectively present a representative logic flow chart for mobile conference failure management, FIG. 5, 513, as discussed above.

The mobile conference mobility management (MCMM) function, FIG. 5, 514, is the last of the mobile voice conference service (MCSF) functions, FIG. 5, 500, that remains to be explained. Conference mobility management provided in accordance with the present invention enables successful operation of the seamless and automatic reconnection process of the invention to proceed notwithstanding the mobility of the PCN users moving the mobile telephones 343 from cell to cell within a single network 340 or between more than one such network 340. In the most extreme case, crossing a cell boundary takes a user $u_i$ out of the "starting" network $S(u_i)$ into another network, for instance a network $N_j(u_i)$. This requires a significant exchange of intra-PCN signaling messages. The most complex situation arises when the mobile user moves rapidly move back and forth across the boundaries of multiple networks 340, with or without visiting its home network during such movements which is introduced and described in Ref. 13, noted above, and the references cited there for proposals to mitigate the adverse effects resulting from such a situation, which are hereby incorporated by reference.

Figure 21:
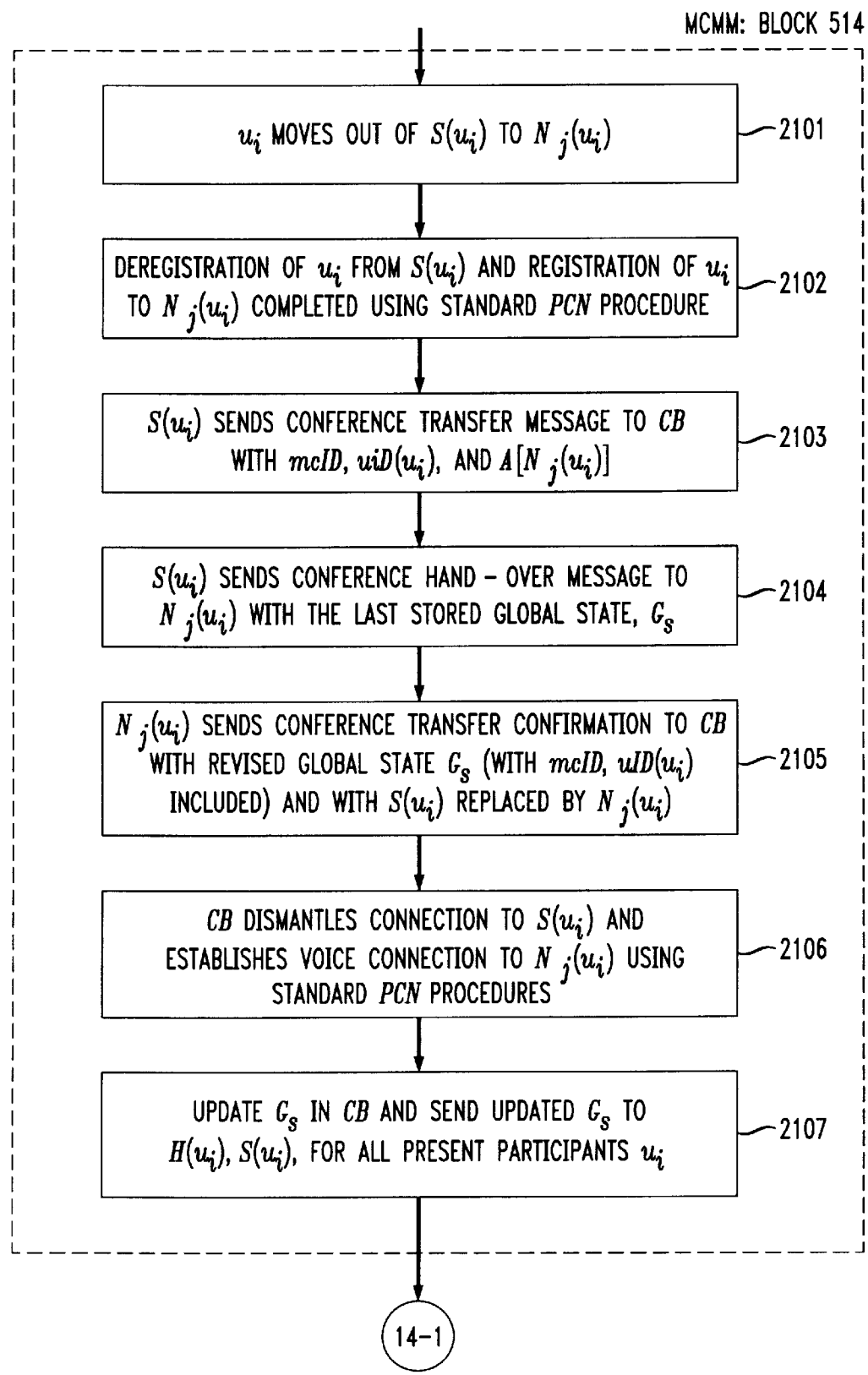
FIG. 21 is a logic flow chart of the preferred method for mobility management for the mobile voice conference of this invention.

Because this is the most general case with respect to complexity, other cell-to-cell movement of more limited scope is not separately described. FIG. 21 represents a logic flow chart of the preferred method for the mobile conference mobility management, FIG. 5, 514, which preserves the integrity of mobile voice conference connections between a mobile voice conference participant, $u_i$, and its appropriately assigned $S(u_i)$, during any hand-over operation using the standard mobility management functions as the base, as discussed in, for example, Ref. 11, noted above, Ref. 5, noted above, and Ref. 6, noted above. Referring to FIG. 21, to be specific, assume that $u_i$ moves out of the area controlled by $S(u_i)$ to a new area under the control of a different MSC, $N_j(u_i)$ 2101. The mobile telephone $u_i$ deregisters from $S(u_i)$ and registers and establishes a voice connection with $N_j(u_i)$ using standard PCN mobility management procedures, for example, Ref. 11, noted above. $S(u_i)$ then sends a network-network conference-transfer message, nCX, to CB with the information elements mcID, uID($u_i$), and A[$N_j(u_i)$] 2103. $S(u_i)$ also sends a network-network conference-handover message, nCH, to $N_j(u_i)$ with the last stored global state information, $G_S$ 2104. Next $N_j(u_i)$ sends a network-network conference-transfer confirmation message, nCXC, to CB with the revised global state $G_S$ (which contains mcID, and uID($u_i$) unchanged) obtained by replacing all references to $S(u_i)$ with $N_j(u_i)$ 2105. CB dismantles the voice connection to $S(u_i)$ and establishes a voice connection to $N_j(u_i)$ using standard PCN procedures as described in, for example, Ref. 11, noted above, Ref. 5, noted above, and Ref. 6, noted above 2106. Finally, the global state information is updated in CB and the updated $G_S$ is then sent by CB using nGSU to $H(u_i)$ and $S(u_i)$ for all present participants, including the specific mobile telephone $u_i$ for which the conference hand-over was just made 2107, thus completing the last step of the mobile conference mobility management functions of FIG. 5, 514. At this stage $N_j(u_i)$ becomes the new serving MSC for $u_i$, i.e., its new $S(u_i)$. As for the Type 1 connection loss, here also the mobile voice conference remains in the "In Progress with k participants" with k remaining unchanged before and after the conference connection hand-over.

Thus, it is seen that the invention enables creation of a robust voice conference service in the PCN environment in which unintended disconnections with a mobile user are automatically restored. The PCN 340 transparently maintains the connection between the conference bridge 801 and the user of the mobile telephone 343 regardless of changing locations of the user. The mobility needs are accommodated as an extension to the already sophisticated mobility management functions that are available in today's wireless cellular networks. This is accomplished by changing only the software in a mobile telephone used by a subscriber of the mobile voice conference service, and only software changes to the existing PCN network equipment that corresponds to accommodating all the new messages and their associated message handling procedures introduced in this invention.

Figure 22:
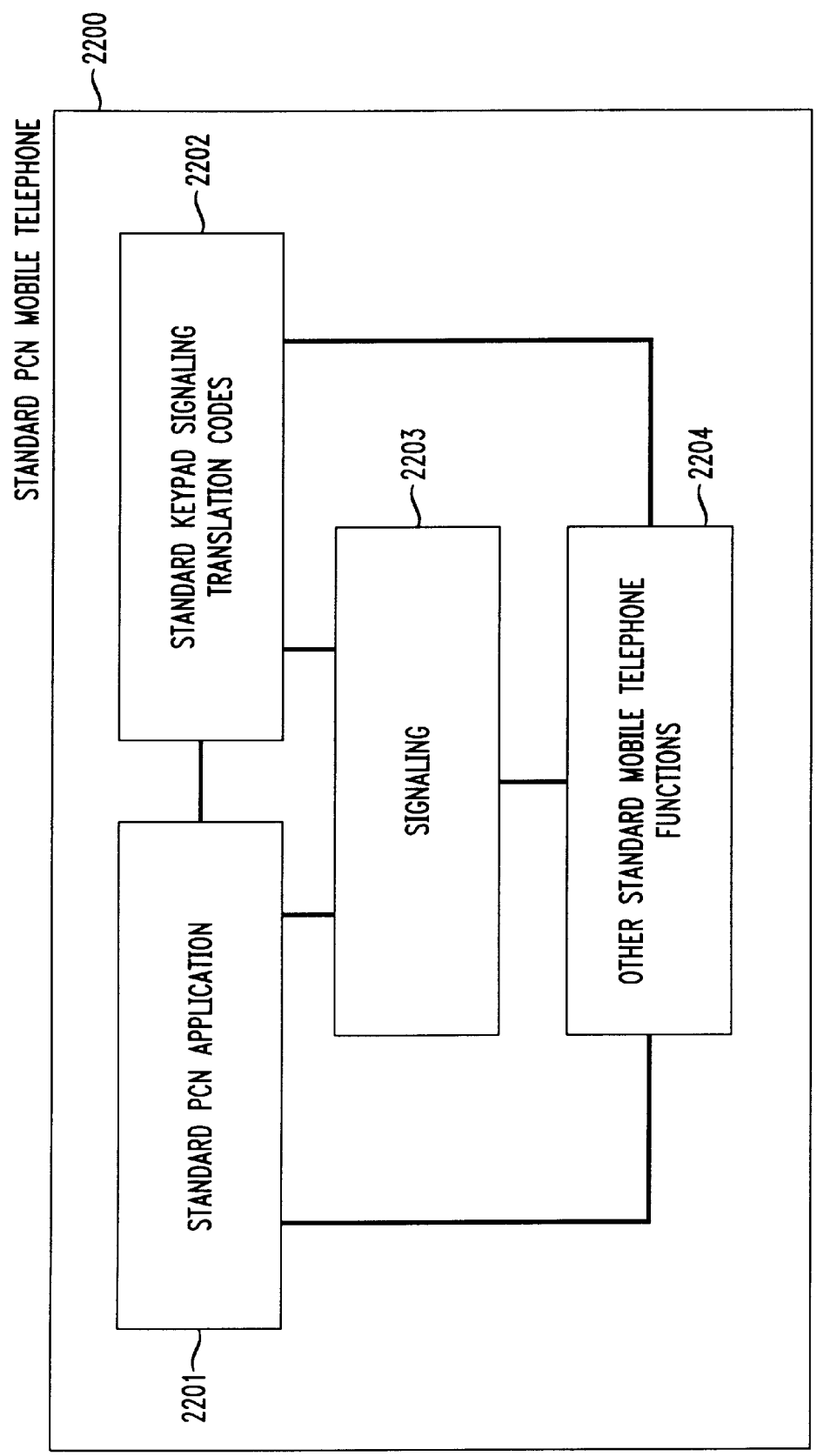
FIG. 22 shows a functional block of a standard prior art PCN mobile telephone.
Figure 23:
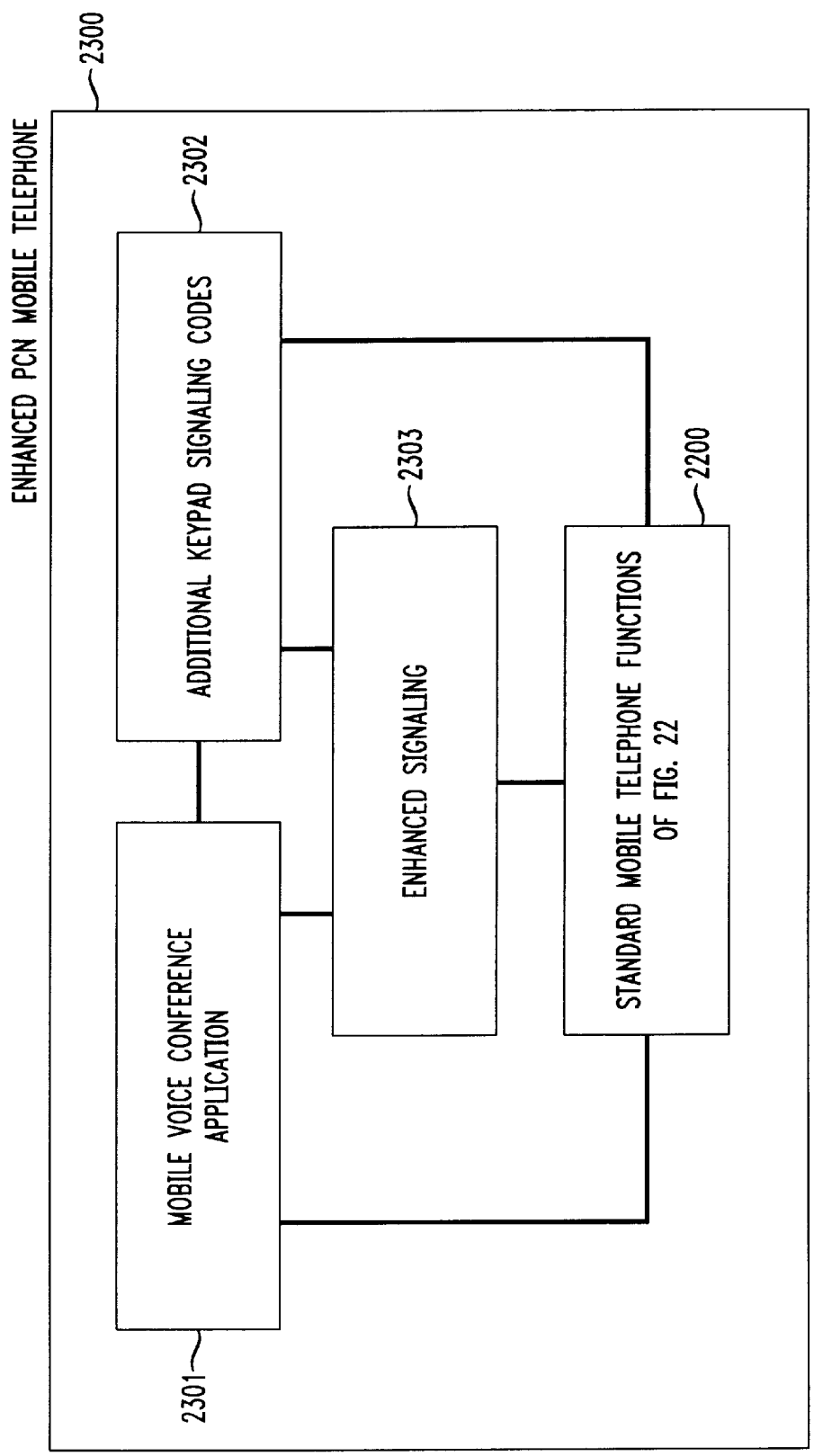
FIG. 23 shows a functional representation of an enhanced PCN mobile telephone preferably for use with the mobile voice conference service of this invention.

In the case of a standard mobile telephone set 343, the number/letter and other symbol push-button switches are all the same and unchangeable. Therefore, a user is limited to a combination of the existing standard push-buttons to signal to the PCN 340. Specifically, the users enter information as a combination of numbers as well as asterisk and a pound sign used to delimit numerical sequences. Software in the mobile telephone 343 translates these combinations into the appropriate user-to-network messages. The particular translation code is determined by the mobile telephone service provider, for the translation function, whether implemented in firmware or software, remains entirely localized to the mobile terminal. FIG. 22 illustrates a set of possible functional groupings of the functions 2200 in a standard mobile telephone 343, Ref. 11, noted above. To support the mobile voice conference service of this invention, the mobile telephone must also support all of the new network-to-user and user-to-network messages by extending the repertoire of the translation codes, as well as the associated procedures for handling these messages. Standard PCN Application and Signaling blocks represented in FIG. 22 are preferably implemented as software modules. The Standard Keypad Signaling Codes is preferably implemented in software, ROM, or in other storage devices, e.g., a PCMCIA card, etc. As discussed above, these are accomplished by adding additional software, as shown in FIG. 23, 2300, to that of the standard mobile telephone FIG. 22, 2200. MVC Application and Enhanced Signaling blocks represented in FIG. 23 are preferably implemented as software modules. The Additional Keypad Signaling Codes is preferably implemented in software, ROM, or in other storage devices, e.g., a PCMCIA card, etc.

GLOSSARY: SYMBOLS AND ABBREVIATIONS

A[E] The unique SS7 address of a CCSN network element, E, e.g., a mobile switching center b The largest total number of participants allowed in a mobile voice conference of this invention (negotiated during conference reservation)

BS Base station system, Ref. 11, noted above

CB Conference Bridge, and depending on the context, also the switching center containing the conference bridge CCS Common Channel Signaling CCSN Common Channel Signaling Network CM Communication Management, Ref. 11, noted above $C_N$ Uniquely assigned digit string to be dialed by a potential participant to join a mobile voice conference of this invention $DN(u_i)$ The unique PCN dialing number $DN(u_i)$ assigned to the mobile telephone, $u_i$ $G_S$ The Global State information for a mobile voice conference of this invention $H(u_i)$ The home network (PCN), characterized by a unique MSC in this invention IN Intelligent Network, Ref. 5 and Ref. 6, noted above ISUP ISDN User Part of SS7 k Number of active participants at a given time instant in a mobile voice conference of this invention MAP Mobile Application Part, Ref. 5, Ref. 6, Ref. 11, noted above MCFM Mobile Conference Failure Management of this invention MCI Mobile voice Conference Initialization of this invention mcID Unique network-assigned reference identifying a specific mobile voice conference of this invention MCMM Mobile Conference Mobility Management of this invention MCPM Mobile Conference Participation Management of this invention MCSF Mobile voice conference service functions of this invention MCSN Mobile Conference Service Network of this invention MM Mobility Management, Ref. 11, noted above MSC Mobile Switching Center MTP Message Transfer Part (of SS7)

MVCS Mobile Voice Conference Service of this invention

Nac Network-to-network add-to-conference message, introduced as part of the mobile voice conference service of this invention, to convey the information elements mcID, DN(p), and type of p, from $S(u_i)$ to CB for adding a new participant, p NcbAR Network-to-network conference-bridge-activation-request message, introduced as part of the mobile voice conference service of this invention, to convey the information elements mcID, $T_{max}$, uID($u_i$), and A[H($u_c$)] from $S(u_c)$ to CB NccR Network-to-network conference-connection-released message, introduced as part of the mobile voice conference service of this invention, to convey the information elements mcID and uID($u_i$) from CB to H($u_c$)

nCDR Network-to-network conference-disconnect request message, introduced as part of the mobile voice conference service of this invention, to convey the information elements mcID and uID($u_i$) from $S(u_i)$ to CB Nch Network-network conference-handover message, introduced as part of the mobile voice conference service of this invention, to convey the last stored global state information, $G_S$ in $S(u_i)$ from $S(u_i)$ to $N_j(u_i)$ Ncii Network-to-network conference-identifier-information message, introduced as part of the mobile voice conference service of this invention, to convey the information element mcID from CB to S(p) for a potential new mobile telephone participant, p wishing to join the conference identified by mcID nCL1 Network-to-network Type-1-connection-lost message, introduced as part of the mobile voice conference service of this invention, to convey the information elements mcID, uID($u_i$),and $T_L$, $S(u_i)$ to CB upon detection of a Type 1 connection loss Ncl2 Network-to-network Type-2-connection-segment-lost message, introduced as part of the mobile voice conference service of this invention, to convey the information elements mcID, uID($u_i$), status for the lost voice connection segment connected to $S(u_i)$, and $T_L$, from $S(u_i)$ to CB upon detection of a Type 2 connection loss NcsC Network-to-network conference-set-up-confirm message, introduced as part of the mobile voice conference service of this invention, to convey the information elements mcID, $T_S$, $T_{max}$, and A[CB] from H($u_c$) to $S(u_c)$ nCSR Network-to-network conference-set-up-request message, introduced as part of the mobile voice conference service of this invention, to convey the information elements mcID, uID($u_c$), and A[S($u_c$)] from $S(u_c)$ to H($u_c$)

Nct Network-to-network conference-termination message, introduced as part of the mobile voice conference service of this invention, to convey the information element mcID from CB to H($u_i$) and $S(u_i)$ for the single current participant $u_i$ announcing the termination of the conference identified by mcID NctP Network-to-network conference-terminated-by-participant message, introduced as part of the mobile voice conference service of this invention, to convey the information element mcID from $S(u_i)$ to CB nCX Network-network conference-transfer message, introduced as part of the mobile voice conference service of this invention, to convey the information elements mcID, uID($u_i$), and A[$N_j(u_i)$] from $S(u_i)$ to CB NcxC Network-network conference-transfer-confirmation message, introduced as part of the mobile voice conference service of this invention, to convey the revised global state $G_S$ from $N_j(u_i)$ to CB NgsU Network-to-network global-state-update message, global state information, $G_S$, from CB to H($u_i$) and $S(u_i)$ for all current participants $u_i$ nuJRD Network-to-user join-request-denial message, introduced as part of the mobile voice conference service of this invention, to convey the request denial information from $S(u_i)$ to $u_i$ PCN Personal Communication Network PLMN Public Land Mobile Network PSTN Public Switched Telephone Network RRM Radio Resource Management, Ref. 11, noted above $S(u_i)$ The (temporary) serving network (PCN), characterized by a unique MSC in this invention SC A PSTN Switching Center SCCP Signaling Connection Control Part (of SS7)

SCP Service Control Point of an Intelligent Network

SS7 Common Channel Signaling System No. 7

SSP Service Switching Point of an Intelligent Network

STP Signal Transfer Point of a CCSN $T_c$ A time-stamp containing the instant when this specific global state information $G_S$ is created or updated;

TCAP Transaction Capabilities Application Part (of SS7)

$T_{dur}$ Duration of the conference up to the current time instant;

$T_{dur} =_{df} \max(T_{dur}(u_i), \ldots, T_{dur}(u_i))$ $T_{dur}(u_i)$ Total duration of participation at the conference up to the current time instant by user $u_i$ $T_L$ time-stamp indicating the time instant when the loss of a particular connection segment was detected during the mobile voice conference of this invention $T_{max}$ Maximum allowable duration of the mobile voice conference of this invention, established during conference reservation $T_S$ Pre-scheduled start time of the mobile voice conference of this invention $u_c$ The mobile telephone used by the initiator of the mobile voice conference service of this invention $u_i$ A typical mobile telephone used by a subscriber to the mobile voice conference service of this invention uID($u_i$) The unique user identification for $u_i$, including the PCN dialing number DN($u_i$) and other PCN accessible identifiers as discussed in Ref. 11, noted above unANP User-to-network add-new-participant-request message, introduced as part of the mobile voice conference service of this invention, to convey the information elements uID($u_i$), mcID and DN(p), from $u_i$ to $S(u_i)$ for adding a new participant p unCER User-to-network conference-exit-request message, introduced as part of the mobile voice conference service of this invention, to convey the mobile telephone's desire to leave the conference identified by mcID from $u_i$ to $S(u_i)$ unCSR User-to-network conference-set-up-request message, introduced as part of the mobile voice conference service of this invention, to convey the information elements mcID, and uID($u_c$) from $u_c$ to $S(u_c)$ unCT User-to-network conference-termination message, introduced as part of the mobile voice conference service of this invention, to convey the information elements mcID and uID($u_i$), from $u_i$ to $S(u_i)$ While a preferred embodiment has been disclosed in detail, it should be appreciated that the concepts of the invention are not limited to those details but, rather, are defined in the appended claims.

What is claimed is:

1. In a telecommunication network including a plurality of mobile telephones and a conference bridge for establishing voice conference connections between a plural number of the plurality of mobile telephones when communication linked with the conference bridge, the improvement being a connection recovering, mobile, telephonic, voice conferencing system, comprising:

means for detecting disconnection of a conference communication link between any one mobile telephone of the plural number mobile telephones and the conference bridge, wherein any one mobile telephone having means for actuating a general end call function to generate a general call termination signal;

means responsive to the detecting means for sensing that any one mobile telephone is participating in a voice conference;

means responsive to the sensing means and actuation of the general end function to also automatically transmit a conference termination signal when the general call function is actuated while the mobile telephone is participating in a voice conference; and means responsive to the sensing means for automatically establishing reconnection of the conference communication link between the one mobile telephone and the conference bridge upon disconnection of the conference communication link without detection of the general call termination signal.

2. The telecommunication network of claim 1 in which the detecting means includes means for distinguishing between an intentional disconnection initiated by action taken at the one mobile telephone and unintentional disconnection resulting from other causes, and means for providing an indication of disconnection to the re-establishing means only in response to detection of an intentional disconnection.

3. The telecommunication network of claim 2 in which the one mobile telephone includes means for transmitting a conference disconnect signal indicating an intention to disconnect from the conference, and the distinguishing means includes means responsive to receipt of the conference disconnect signal to distinguish between intentional disconnection and unintentional disconnection.

4. The telecommunication system of claim 3 in which the one mobile telephone includes means for transmitting a conference termination signal indicating an intention to both disconnect from and to end the conference, and the distinguishing means includes means responsive to receipt of the conference termination signal to distinguish between intentional disconnection and unintentional disconnection.

5. The telecommunication system of claim 2 in which the one mobile telephone includes means for transmitting a conference termination signal indicating an intention both to disconnect from and to end the conference, and the distinguishing means includes means responsive to receipt of the conference termination signal to distinguish between intentional disconnection and unintentional disconnection.

6. The telecommunication network of claim 2 in which the one mobile telephone includes means for actuating a general end call function to transmit a general call termination signal, and means for sensing that the mobile telephone is participating in a voice conference, and said distinguishing means includes means responsive to actuation of the general end call function to distinguish between an intentional disconnection and an unintentional disconnection.

7. The telecommunication network of claim 6 in which the one mobile telephone includes means responsive both to the sensing means and actuation of the general end function to transmit a conference disconnect signal when the general call end function is actuated while the mobile telephone is participating in a voice conference, and the distinguishing means includes means responsive to receipt of the termination of conference signal to distinguish between an intentional disconnection and an unintentional disconnection.

8. The telecommunication network of claim 7 in which the one mobile telephone includes means responsive to actuation of the termination of call function to generate an termination of call signal both when participating in the conference and when not participating in the conference.

9. The telecommunication network of claim 1 in which the detecting means includes means for monitoring the connection status of the communication link of the one mobile telephone with a communication port of the conference bridge, and means responsive to the monitoring means detecting disconnection of the communication link for distinguishing between an intentional disconnection and an unintentional disconnection.

10. The telecommunication network of claim 9 in which the detecting means includes means responsive to the monitoring means and to receipt of a connection termination message from the one mobile telephone prior to the disconnection for distinguishing an intentional disconnection from an unintentional disconnection.

11. The telecommunication network of claim 1 including means for terminating the voice conference, and means responsive to termination of the conference to disable the reconnection establishing means.

12. The telecommunication network of claim 11 in which the terminating means includes at least one of means responsive to lapse of a pre-selected maximum conference time limit, means responsive to receipt of an termination conference signal from the one mobile telephone, and means responsive to the number of participants to the conference falling below a pre-selected minimum participant number limit.

13. The telecommunication network of claim 12 in which the terminating means is responsive to at least one of an conference termination signal and an end conference signal from the one mobile telephone, and the mobile telephone includes means to transmit the at least one of the conference termination signal and an conference disconnect signal.

14. The telecommunication network of claim 12 in which the terminating means does not consider participants that have been unintentionally disconnected and with respect to which the reconnection establishing means is attempting to establish reconnection of the communication link when determining if the number of participants has fallen below the pre-selected minimum limit.

15. The telecommunication network of claim 12 in which, the conference terminating means includes means responsive to the maximum conference time limit, and in which the conference bridge is connectable with non-mobile participants, and including means for enabling only a mobile participant to establish the pre-selected maximum conference time limit.

16. The telecommunication network of claim 1 in which the detecting means includes at least one of means for sensing disconnection of the communication link caused by interruption in a land line section of the link between a mobile switching center serving the mobile participant and a mobile switching center with which the conference bridge is associated, means for sensing disconnection of the communication link causes by interruption in a land line section of the link between a mobile base station associated with both the one subscriber and the mobile switching center and the mobile switching center, and means for sensing disconnection of the communication link caused by a interruption in an air wave section of the link between the one mobile participant and the mobile switching center serving the mobile participant during the course of the voice conference.

17. The telecommunication network of claim 16 in which said detecting means includes all of the disconnection sensing means.

18. The telecommunication network of claim 16 in which said detecting means includes the means for sensing disconnection of the air wave link.

19. The telecommunication network of claim 1 including a mobile switching center interconnected between a public switched telephone network and a plurality of subnetworks with at least one of the subnetworks associated with the one mobile telephone to provide mobile air wave communication service to the one mobile telephone, and in which the one mobile telephone includes means for transmitting a signal to the associated subnetwork, the associated subnetwork includes means for sending a conference request message to the mobile switching center in response to the signal from the one mobile telephone, the mobile switching center includes means responsive to the conference request message to cause connection of the one mobile telephone to the conference bridge, the reconnection establishing means includes means at the associated subnetwork for actuating the conference request message sending means to send a conference request message to the mobile switching center to establish reconnection of the communication link with the one mobile telephone automatically in response to the detecting means detecting disconnection of the communication link with the one mobile telephone.

20. The telecommunication network of claim 19 in which the reconnection establishing means includes means for monitoring the detecting means for determining whether automatic sending of the conference request message has resulted in re-establishing the connection of the one mobile telephone, and said actuating means is responsive to the monitoring means to actuate the conference request message to be sent repeatedly if it is determined that a prior automatic sending of the conference request message has failed to result in re-establishment of the connection with the one mobile party.

21. The telecommunication network of claim 20 in which the actuating means is responsive to the monitoring means to stop repeatedly sending the conference request message in response to occurrence of at least one of the events of establishment of the connection in response to the conference request message, passage of a pre-selected time period after a first actuation of the conference request message sending means, and the actuating means sending the conference request message a pre-selected maximum number of times.

22. The telecommunication network of claim 21 in which the actuating means is responsive to the first to occur of the events to stop repeatedly sending the conference request message.

23. The telecommunication network of claim 20 including means for disabling the actuating means in response to termination of the conference prior to establishment of the reconnection of the communication link with the one mobile telephone.

24. The telecommunication network of claim 19 in which the re-establishing means includes
   means for establishing a maximum limit to the number of times that unsuccessful attempts are to be made to reestablish connection with the one mobile telephone,
   means for monitoring the number of times that the conference request message is automatically sent to re-establish communication with the one mobile telephone, and
   means responsive to the monitoring means and to the maximum limit establishing means for terminating further attempts to re-establish connection of the communication link with the one mobile telephone after the number of attempts equals the maximum limit.

25. The telecommunication network of claim 1 in which
   an initiator mobile telephone from which the conference is initiated is included in the plural number of mobile telephones,
   the initiator mobile telephone at any given time is located within the service area of an initiator current service subnetwork of a plurality of mobile subnetworks of a personal communication mobile network that is part of the telecommunication network, and
   the personal communication mobile network includes means for storing global state information about the voice conference.

26. The telecommunication network of claim 25 in which
   the initiator mobile telephone has one relatively permanently associated initiator home subnetwork of the plurality of mobile subnetworks of the personal communication mobile network, and
   said global state information storing means includes means at the initiator home subnetwork for storing the global state information.

27. Telecommunication network of claim 26 in which
   the initiator mobile telephone at any given time is in a service area and currently receives service from an initiator current service subnetwork, and
   the global state information storing means includes means at the initiator current service subnetwork for separately storing the global state information when the initiator mobile telephone is in a service area other than a service area of the relatively permanently associated initiator home subnetwork.

28. The telecommunication network of claim 27 in which the initiator current service subnetwork includes means for acquiring the global state information about the voice conference,
   means for ascertaining whether the initiator current service subnetwork is different from the initiator home subnetwork,
   means responsive to the ascertaining means for transmitting the global state information from the initiator current service subnetwork to the initiator home subnetwork for duplicate storage of the global information at the initiator home subnetwork when the initiator current service subnetwork is different from the initiator home subnetwork.

29. The telecommunication network of claim 25 in which the global state information includes
   conference start time,
   current time,
   conference bridge node address,
   number of communication ports of the conference bridge being currently used to connect with individual conference participants, and
   for each participant,
      a unique identification code of the mobile telephone of the participant,
      a unique identification code of each service subnetwork currently serving the mobile telephone of the participant,
      a unique identification code of the home subnetwork of the mobile telephone of the participant,
      the status of the connection between the service subnetwork currently servicing the mobile telephone of the participant and the mobile telephone of the participant, and
      the status of the connection of the communication link between the service subnetwork and the conference bridge.

30. The telecommunication network of claim 29 in which the status of the connection of the communication link between the initiator current service subnetwork of the mobile telephone and the mobile telephone is indicated as one of active, voluntary inactive and involuntary inactive.

31. The telecommunication network of claim 29 in which the status of the connection of the communication link between the current service subnetwork and the a control node of the conference bridge is indicated as one of active, voluntary inactive and involuntary inactive.

32. The telecommunication network of claim 25 including means for updating the global state information.

33. The telecommunication network of claim 32 in which the global state information updating means includes
   means for detecting a change in the global state information, and
   means responsive to the change detecting means for updating the global state information only when a change is detected.

34. The telecommunication network of claim 32 in which the global state information updating means includes means for generating update information representative of only portions of the global state information that have changed.

35. The telecommunication network of claim 25 in which
   the initiator mobile telephone is relatively permanently associated with an initiator home subnetwork, and
   the initiator current service includes means to acquire the global state information and means to convey the acquired global state information to the initiator home subnetwork.

36. In a telecommunication network including a plurality of mobile telephones and a conference bridge for making voice conference connections between a plural number of the plurality of mobile telephones when communication linked with the conference bridge, the improvement being a connection recovering, mobile voice conferencing method, comprising the steps of:
   associating one mobile telephone from the plurality of mobile telephones with at least one of a plurality of subnetworks of a mobile switching center interconnected between a public switched telephone;

transmitting a signal from the one mobile telephone to the associated subnetwork, sending a conference request message from the associated subnetwork to the mobile switching center in response to the signal from the one mobile telephone;

making connection at the mobile switching center of the one mobile telephone to the conference bridge in response to receipt of the conference request message, detecting disconnection of a conference communication link between any one mobile telephone of the plural number mobile telephones and the conference bridge; and automatically establishing reconnection of the conference communication link between the one mobile telephone and the conference bridge in response to detection of disconnection by sending from the associated subnetwork the conference request message to the mobile switching center to establish reconnection of the communication link with the one mobile telephone automatically in response to detecting disconnection of the communication link with the one mobile telephone.

37. The method of claim 36 including the steps of distinguishing between an intentional disconnection initiated by action taken at the one mobile telephone and unintentional disconnection resulting from other causes, and providing an indication of disconnection to the re-establishing means only in response to detection of an intentional disconnection.

38. The method of claim 36 in which the step of detecting includes the steps of monitoring the connection status of the communication link of the one mobile telephone with a communication port of the conference bridge, and distinguishing between an intentional disconnection and an unintentional disconnection upon detection of the disconnection of the communication link.

39. The method of claim 36 including the steps of terminating the voice conference, and disabling performance of the step of establishing reconnection.

40. The method of claim 36 in which the step of detecting includes at least one of the steps of sensing disconnection of the communication link caused by interruption in a land line section of the link between a mobile switching center serving the mobile participant and a another mobile switching center with which the conference bridge is associated, sensing disconnection of the communication link causes by interruption in a land line section of the link between a mobile base station associated with both the one subscriber and the mobile switching center and the mobile switching center, and sensing disconnection of the communication link caused by a interruption in an air wave section of the link between the one mobile participant and the mobile switching center serving the mobile participant during the course of the voice conference.

41. The method of claim 36 including the steps of initiating the conference from an initiator mobile telephone included in the plural number of mobile telephones that is located within the service area of an initiator current service subnetwork of a plurality of mobile subnetworks of a personal communication mobile network that is part of the telecommunication network, and storing global state information about the voice conference within the personal communication mobile network.

\* \* \* \* \*